(12) United States Patent
Alturki

(10) Patent No.: US 12,718,702 B1
(45) Date of Patent: Aug. 25, 2026

(54) VIRTUAL REALITY OSCE AND SOE PLATFORM WITH MULTIMODAL EVIDENCE NORMALIZATION AND RUBRIC-LEDGER SCORING UNDER SERVER-AUTHORITATIVE SESSION ORCHESTRATION

(71) Applicant: Academy of Sciences, Riyadh (SA)

(72) Inventor: Saud Abdulaziz D Alturki, Riyadh (SA)

(73) Assignee: Saud Abdulaziz D Alturki, Riyadh (SA)

( * ) Notice: Subject to any disclaimer, the term of this patent is extended or adjusted under 35 U.S.C. 154(b) by 0 days.

(21) Appl. No.: 19/556,213

(22) Filed: Mar. 4, 2026

(51) Int. Cl.
*G09B 7/00* (2006.01)
*G02B 27/01* (2006.01)
*G10L 15/26* (2006.01)

(52) U.S. Cl.
CPC .......... *G09B 7/00* (2013.01); *G02B 27/0172* (2013.01); *G10L 15/26* (2013.01)

(58) Field of Classification Search
CPC ........... G09B 7/00; G06F 3/011; G06F 3/167
See application file for complete search history.

(56) References Cited

U.S. PATENT DOCUMENTS 8,016,598 B2 * 9/2011 Eggert ................ G09B 23/281 434/267
9,196,176 B2 * 11/2015 Hager .................... G09B 23/28
2002/0127525 A1 * 9/2002 Arington ................. G09B 7/04 434/262
2008/0020361 A1 * 1/2008 Kron ..................... G09B 23/28 434/262
2010/0157018 A1 * 6/2010 Lampotang ........... G06T 19/003 348/E7.001
2011/0165542 A1 * 7/2011 Campbell ................ G09B 5/00 434/219
2017/0213473 A1 * 7/2017 Ribeira .................... G09B 9/00
2019/0057620 A1 * 2/2019 Eggert .................. G06T 19/006
2023/0147689 A1 * 5/2023 Buras ...................... G06F 3/011 434/262
2023/0419855 A1 * 12/2023 Wallace ................ G09B 19/00
2026/0080799 A1 * 3/2026 Choi ...................... A47B 41/02

* cited by examiner

*Primary Examiner* — Peter R Egloff
(74) *Attorney, Agent, or Firm* — WCF IP

(57) ABSTRACT

A virtual reality platform virtualizes structured clinical assessment stations including objective structured clinical examinations (OSCEs) and structured oral examinations (SOEs). A VR client renders a clinical station with at least one of a virtual patient avatar or an examiner avatar and captures multimodal evidence including learner speech and interaction telemetry. A server-authoritative session orchestrator enforces station timing, assigns authoritative timestamps, normalizes speech and interaction evidence into unified event log entries, and maintains scenario state using a branch-graph state machine supporting SOE question sequencing and controlled examiner messages. An analytics engine maintains a rubric ledger linking rubric items to evidence tokens, computes scoring deltas and per-question scores, and generates feedback reports including required-topic coverage and critical-issue indicators. In certain embodiments, a backend management subsystem governs user entitlements and versioned case delivery and brokers access to AI services while preventing persistent storage of protected case content on a learner device.

20 Claims, 40 Drawing Sheets

FIG. 31
The Human Musculature
Repeat Question
End Answer

VIRTUAL REALITY OSCE AND SOE PLATFORM WITH MULTIMODAL EVIDENCE NORMALIZATION AND RUBRIC-LEDGER SCORING UNDER SERVER-AUTHORITATIVE SESSION ORCHESTRATION

TECHNICAL FIELD

The disclosed subject matter relates to immersive virtual reality systems for clinical skills training and assessment, and more particularly to systems that virtualize objective structured clinical examinations (OSCEs) and structured oral examinations (SOEs) using (i) multimodal capture of learner speech and actions, (ii) normalization of captured evidence into a unified event schema, and (iii) rubric-aligned scoring and reporting under server-authoritative timekeeping and scenario state control.

BACKGROUND OF THE INVENTION

Objective structured clinical examinations (OSCEs) are widely used in health-professions education to evaluate clinical competence using structured scenarios and standardized evaluation rubrics. In OSCE settings, candidates are assessed while performing tasks such as history taking, focused examination maneuvers, counseling, and clinical reasoning within a station time limit, often with a standardized or simulated patient and with examiner scoring.

Structured oral examinations (SOEs) are also used in health-professions education and professional credentialing. In a representative SOE, a doctor acts as the examiner and asks the student clinical questions about one or more cases. The student responds by explaining diagnosis, clinical reasoning, and management for each case. The SOE evaluates knowledge, clinical thinking, communication, and professionalism in a structured and realistic manner.

Some assessment approaches rely on in-person examiners who observe station performance and score candidates using checklists and/or global rating instruments. Such approaches may introduce logistical burden associated with staffing, facilities, station repeatability, and scheduling constraints, particularly when OSCE stations and SOE question sequences must be delivered consistently across many candidates.

Some simulation systems provide physical manikins and/or sensorized trainers that detect certain examination maneuvers and provide feedback. Such systems may be well-suited for instrumenting discrete physical actions, but may be less suited for capturing and scoring free-form clinical communication and reasoning, particularly when spoken evidence is to be evaluated together with time-ordered tool-use actions and interface selections.

Some virtual patient systems provide interview practice using computer-based dialogue. Such systems may support speech interaction, but may not provide an immersive station context with integrated timekeeping controls and synchronized evidence capture for OSCE-style workflows, and may not support SOE-style examiner questioning and per-question rubric evaluation.

Some immersive virtual reality (VR) medical simulation platforms provide interactive virtual patients and scenario authoring and can record events for later review. Some OSCE-oriented virtualization disclosures also describe automated evaluation based on required steps, ordering constraints, and time limits, including interaction through displays and audio and, in some cases, head-mounted display and hand-controller interaction.

Notwithstanding the above, in OSCE and SOE delivery contexts there can be technical challenges in: (i) collecting heterogeneous evidence streams (e.g., free-form speech, tool-use/hand actions, and interface selections), (ii) normalizing those streams into a unified representation with reliable timing, (iii) fusing speech and action evidence to score rubric items in real time and/or per-question, and (iv) maintaining station integrity and synchronization when an examiner observes and optionally injects scenario triggers, asks questions, or issues annotations during a live session.

Some systems emphasize predetermined metrics, menu-driven selections, or rigid step ordering, which can constrain evaluation of free-form spoken interactions and clinical reasoning and can complicate alignment between captured evidence and the rubric language used by OSCE and SOE programs.

Accordingly, there is a need for improved VR-based OSCE and SOE virtualization systems that provide reliable, server-authoritative orchestration and timekeeping; evidence normalization and temporal alignment of multimodal interactions; rubric-aligned scoring with traceable evidence provenance; and examiner synchronization mechanisms that support remote observation and controlled, auditable trigger injection and question delivery.

The foregoing background is provided to describe technological context and potential constraints in certain systems and does not constitute an admission that any referenced material is prior art, nor that any particular feature is required, conventional, or common.

SUMMARY OF THE INVENTION

The present disclosure provides a virtual reality (VR) platform configured to virtualize objective structured clinical examination (OSCE) stations and structured oral examination (SOE) stations using centrally governed backend services, server-authoritative session orchestration, and integrated performance evaluation based on multimodal evidence capture and normalization.

In representative OSCE embodiments, a learner wearing a head-mounted display (HMD) and using hand controllers and/or hand tracking performs station tasks including history taking, focused examination actions (including tool-based interactions such as auscultation using a virtual stethoscope), clinical reasoning, and patient counseling within a virtual clinical environment.

In representative SOE embodiments, a learner participates in a structured oral examination in which an examiner subsystem presents clinical questions about a case. The learner responds by explaining diagnosis, clinical reasoning, and management. The system evaluates the learner's knowledge, clinical thinking, communication, and professionalism using rubric-aligned scoring based on captured spoken answers and, in certain embodiments, captured selections such as investigation requests.

The system captures heterogeneous input streams including (i) speech evidence comprising audio frames and/or transcript segments derived from the audio frames and (ii) interaction telemetry including controller/hand poses, object interactions, tool-use events, and/or interface selections. The captured evidence is normalized into a unified event schema (e.g., event log entries) that includes time fields and payload fields sufficient to evaluate station performance and to compute coverage of required topics.

In certain embodiments, a server-authoritative session orchestrator enforces station timing and maintains an authoritative event timeline and scenario state. The session orchestrator receives client-emitted events and speech evidence, assigns authoritative timestamps, and sequences normalized events for downstream scoring and scenario execution, including per-question sequencing in SOE implementations.

In certain embodiments, scenario execution is controlled by a branch-graph state machine architecture in which nodes represent station states (e.g., phases of an encounter, available tools, current SOE question index, and/or examiner prompts) and edges represent conditional transitions triggered by normalized events and/or examiner-issued triggers. Examiner triggers can cause dynamic state transitions (e.g., condition worsens; next question; reveal investigation result) while maintaining auditability through provenance logging.

In certain embodiments, a unified rubric-aligned scoring engine maintains a rubric ledger data structure that tracks satisfaction status of rubric items and links each item to one or more evidence tokens derived from normalized events and transcript segments. Ledger update rules perform transformations including temporal alignment of speech and action evidence, rubric-item mapping, score delta computation, per-question scoring in SOE stations, and real-time feedback generation.

In certain embodiments, the system provides station settings including a guided mode and a timed mode. Guided mode may present in-environment prompts and contextual tips, while timed mode enforces realistic time constraints including a pre-station reading period and a station duration window. Upon station completion, the system generates a structured feedback report including coverage of required topics, competency-domain ratings, and narrative guidance.

In certain embodiments, an examiner subsystem, which may include an AI-driven examiner avatar and/or a remote examiner interface, provides question prompts, controlled triggers, and/or annotations synchronized to the server-authoritative timeline, and such examiner actions are logged with provenance fields to support auditing and review.

In certain embodiments, the system stores centrally governed case definitions, evaluation criteria, weights, AI behavior constraints, session logs, and report artifacts in a data management subsystem accessible only through authenticated backend interfaces, and employs session-bound authorization and secure communications to prevent persistent storage of protected case content on a learner device.

In certain embodiments, a backend management subsystem provides user entitlement management and case governance including case versioning, approval, and publication controls, and binds a station session to an immutable approved case version to preserve assessment integrity.

Additional embodiments, variations, and implementations are described in the Detailed Description and claims.

DETAILED DESCRIPTION

A. Overview and Terminology

The following detailed description is provided with reference to the drawings. The embodiments described herein are examples and are not intended to limit the scope of the claims. A person having ordinary skill in the art will recognize that variations may be implemented without departing from the claimed subject matter.

As used herein, an "OSCE station" refers to a structured simulated encounter having at least a defined time window and one or more evaluation criteria mapped to a rubric. The rubric may include discrete items, weighted items, and/or domain-level ratings, and the encounter may include a standardized or simulated patient and one or more examiner scoring mechanisms.

As used herein, a "structured oral examination" or "SOE" refers to an assessment in which an examiner presents a learner a structured sequence of clinical questions about a case and the learner answers by explaining diagnosis, clinical reasoning, and management. The examiner may be a human examiner, a remote examiner interface, and/or an AI-driven examiner avatar constrained by case content. As used herein, an "SOE station" refers to a timed delivery of such an SOE for a particular case and question set.

As used herein, "multimodal evidence" includes at least speech evidence and interaction evidence captured during an encounter. Speech evidence may include audio frames and derived transcript segments. Interaction evidence may include hand/controller pose telemetry, object interactions, tool-use interactions, interface selections, and examiner messages such as question prompts or triggers.

As used herein, a "normalized event" refers to a data object produced by transforming raw multimodal inputs into a unified event schema. In certain embodiments, a normalized event includes a session identifier, an authoritative timestamp, an actor identifier, an event type, and a payload containing typed fields.

As used herein, "rubric ledger" refers to a structured data store that tracks rubric item satisfaction and evidence linkage. A ledger entry may include a rubric item identifier, a status value, one or more linked evidence tokens, and a score contribution, and may additionally track per-question status for SOE stations.

As used herein, "evidence token" refers to a data object referencing one or more normalized events and/or transcript segments and optionally including derived features used to justify a ledger update and score change. In an SOE station, evidence tokens may be linked to particular questions and to required-topic coverage items for those questions.

As used herein, "branch graph" refers to a graph-based scenario control structure including nodes and edges, in which nodes represent encounter states and edges define conditional transitions based on normalized events, rubric ledger state, timers, and/or examiner triggers and question sequencing controls.

B. System Architecture

Figure 1:
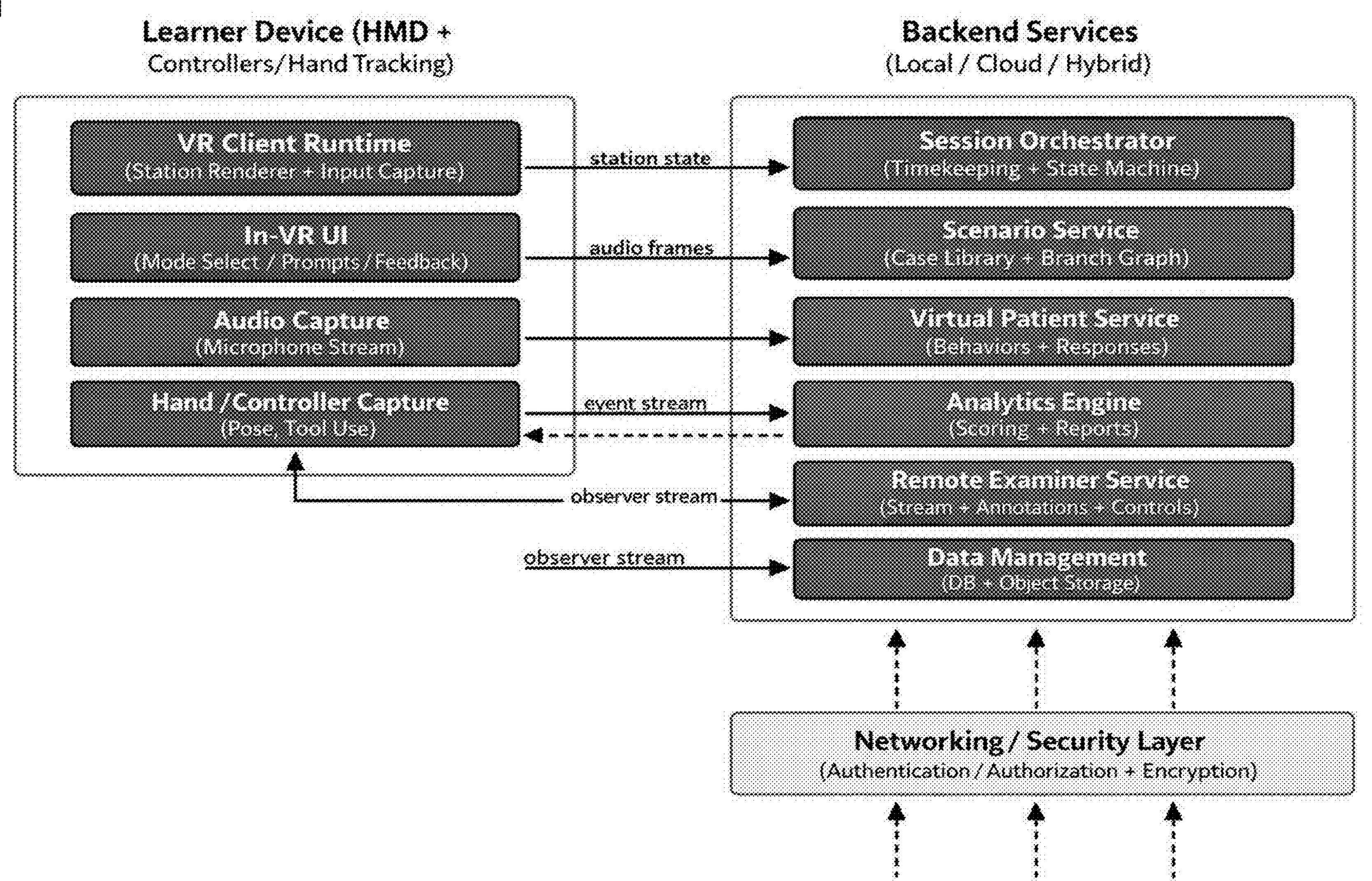
FIG. 1 is a functional block diagram of a VR-based OSCE and SOE virtualization system including a learner VR client, a server-authoritative session orchestrator, a scenario service, a virtual patient service, an analytics engine, an examiner subsystem, and a data management and security layer.
Figure 2:
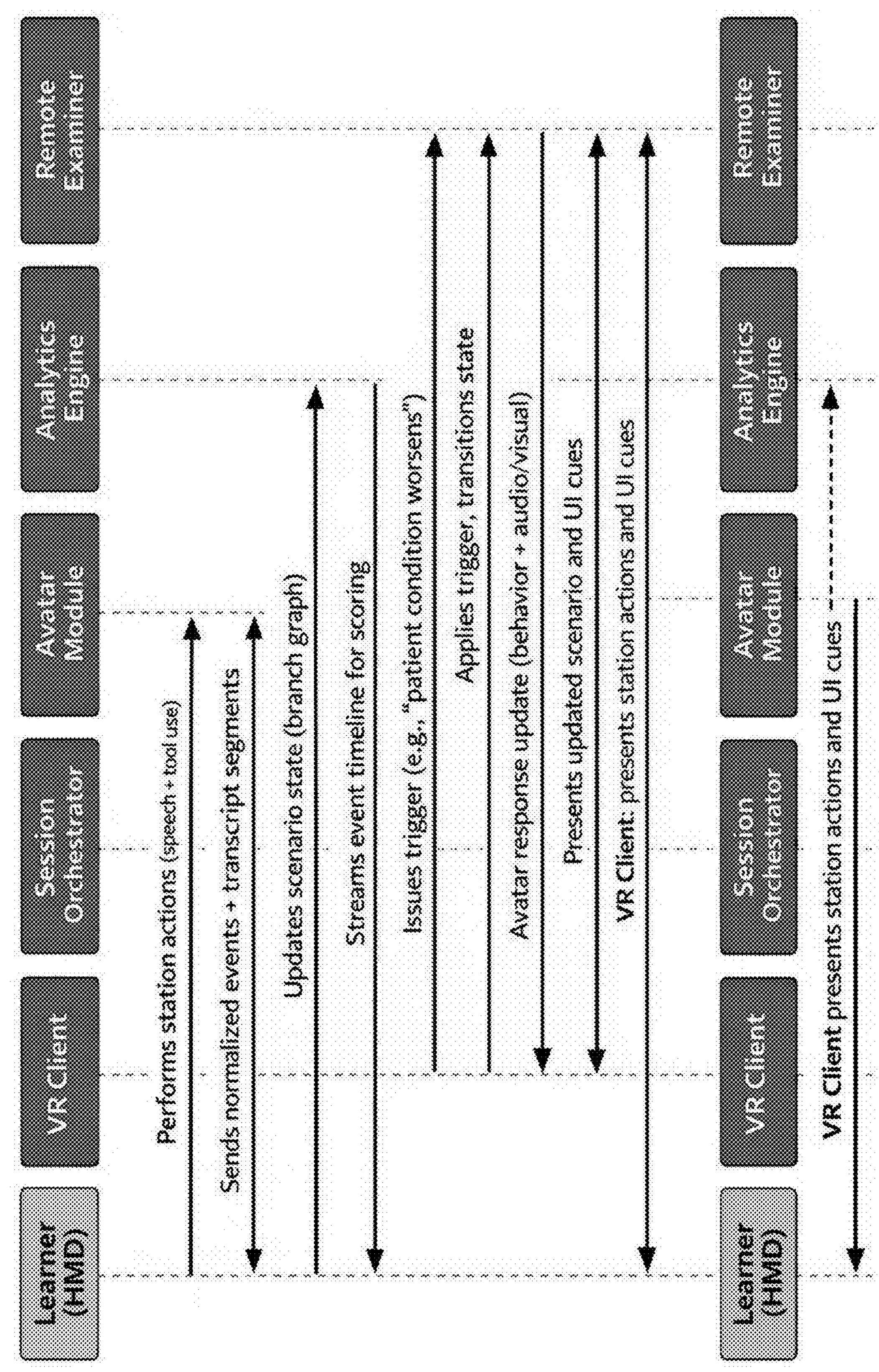
FIG. 2 is a sequence/timeline diagram illustrating interactions among a learner device, a VR client, a session orchestrator, an avatar module, an analytics engine, and an examiner interface during a station.

FIG. 1 illustrates an example VR-based OSCE and SOE virtualization system including a learner device executing a virtual reality client, backend services providing centralized case governance and evaluation, and optionally an examiner device coupled through a network.

The learner device includes a head-mounted display (HMD) and one or more input devices. The input devices may include hand controllers, hand-tracking sensors, microphones, and other motion and audio input mechanisms.

The learner device executes a VR client runtime configured to render an immersive clinical environment for an OSCE station (e.g., an examination room with a patient avatar) and/or to render an SOE environment (e.g., an examination room with an examiner avatar), and configured to capture learner actions and selections within a station session.

The VR client runtime captures speech evidence and interaction evidence. Speech evidence may include microphone audio frames and/or transcript segments derived from the audio frames. Interaction evidence may include hand/controller pose telemetry, object interactions, tool-use interactions, and interface selections.

Figure 7:
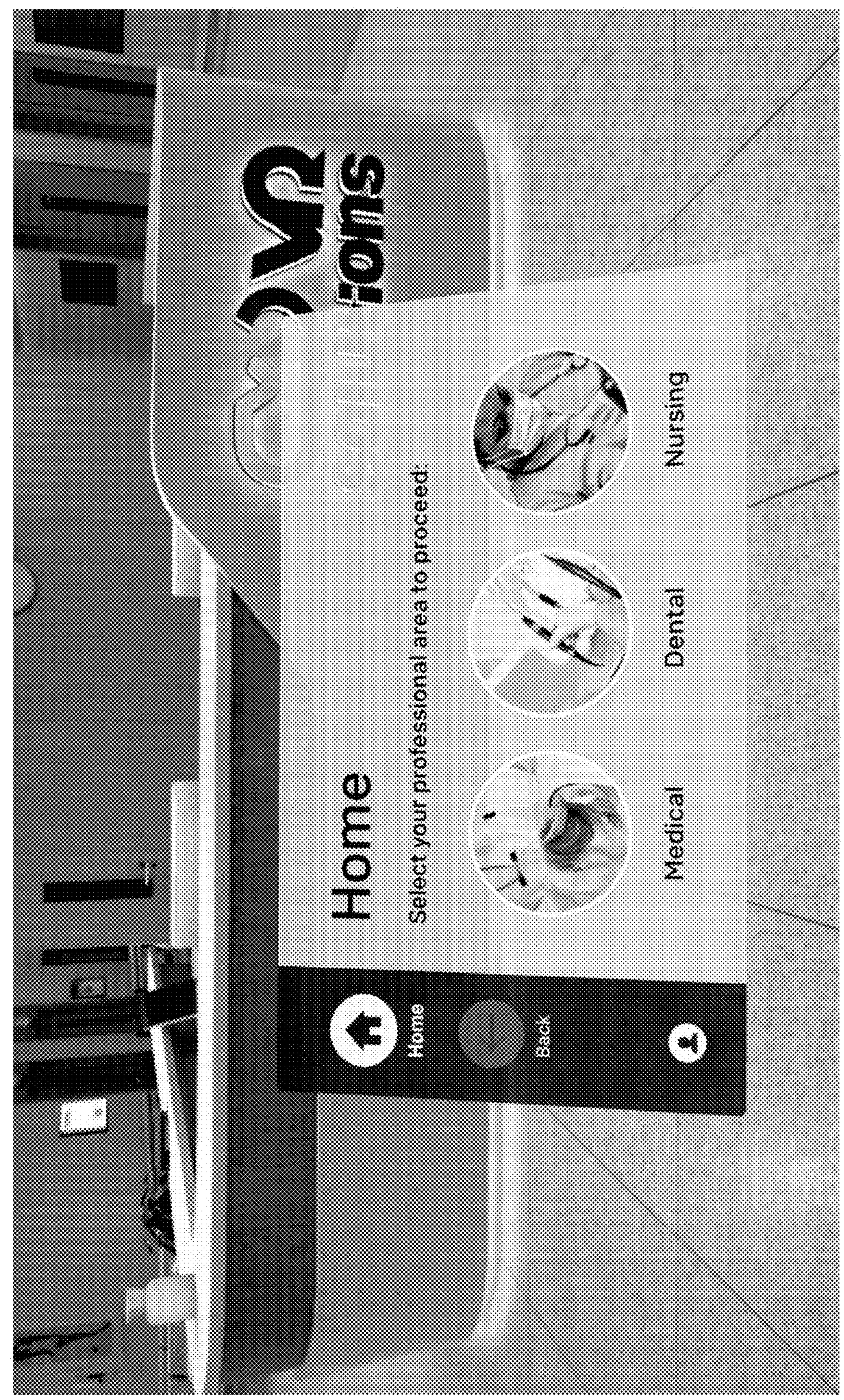
FIG. 7 illustrates an example home screen in the VR environment by which a learner selects a professional area, including medical, dental, and nursing.
Figure 8:
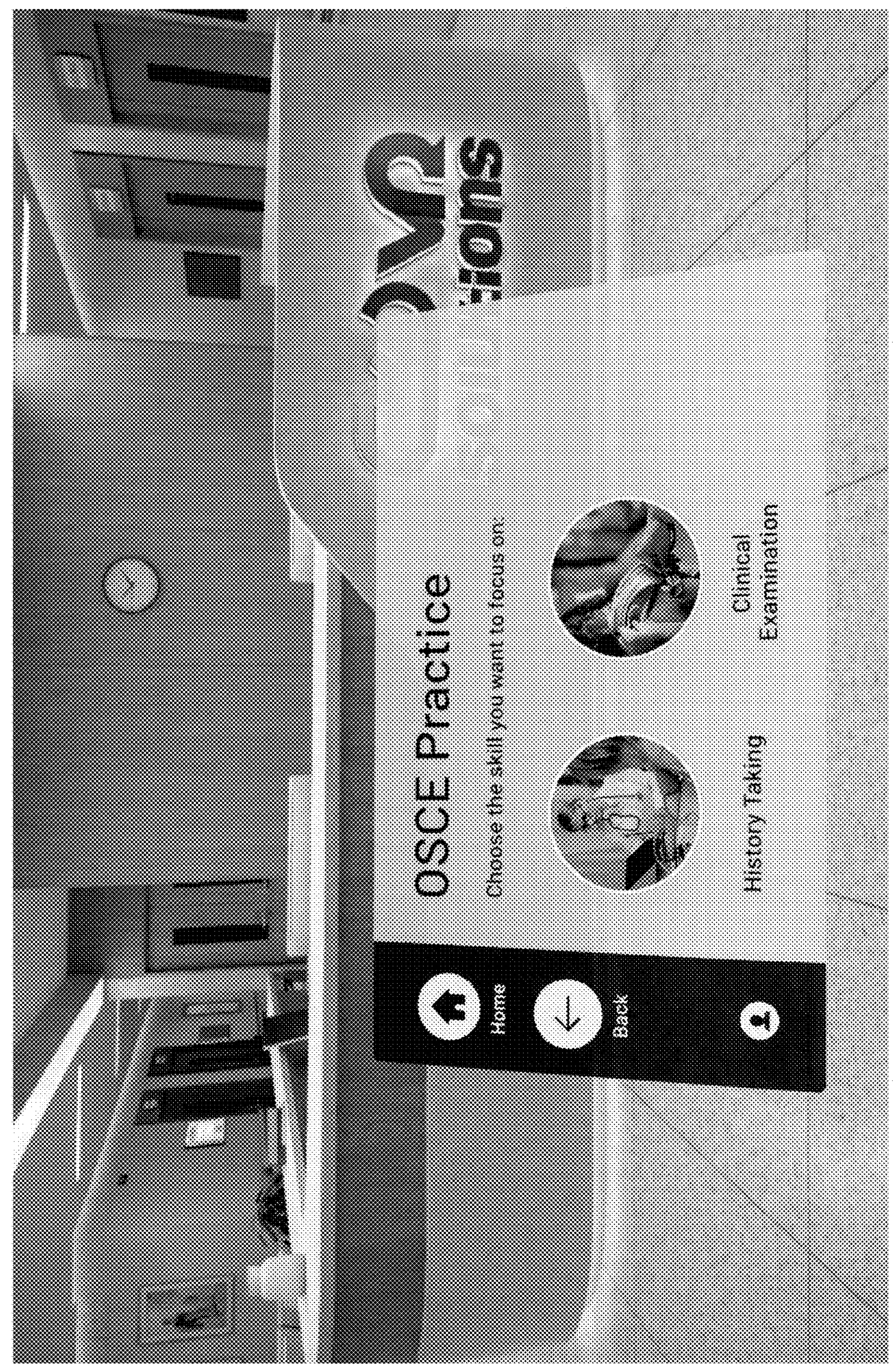
FIG. 8 illustrates an example OSCE practice selection interface including selectable categories for history taking and clinical examination.
Figure 9:
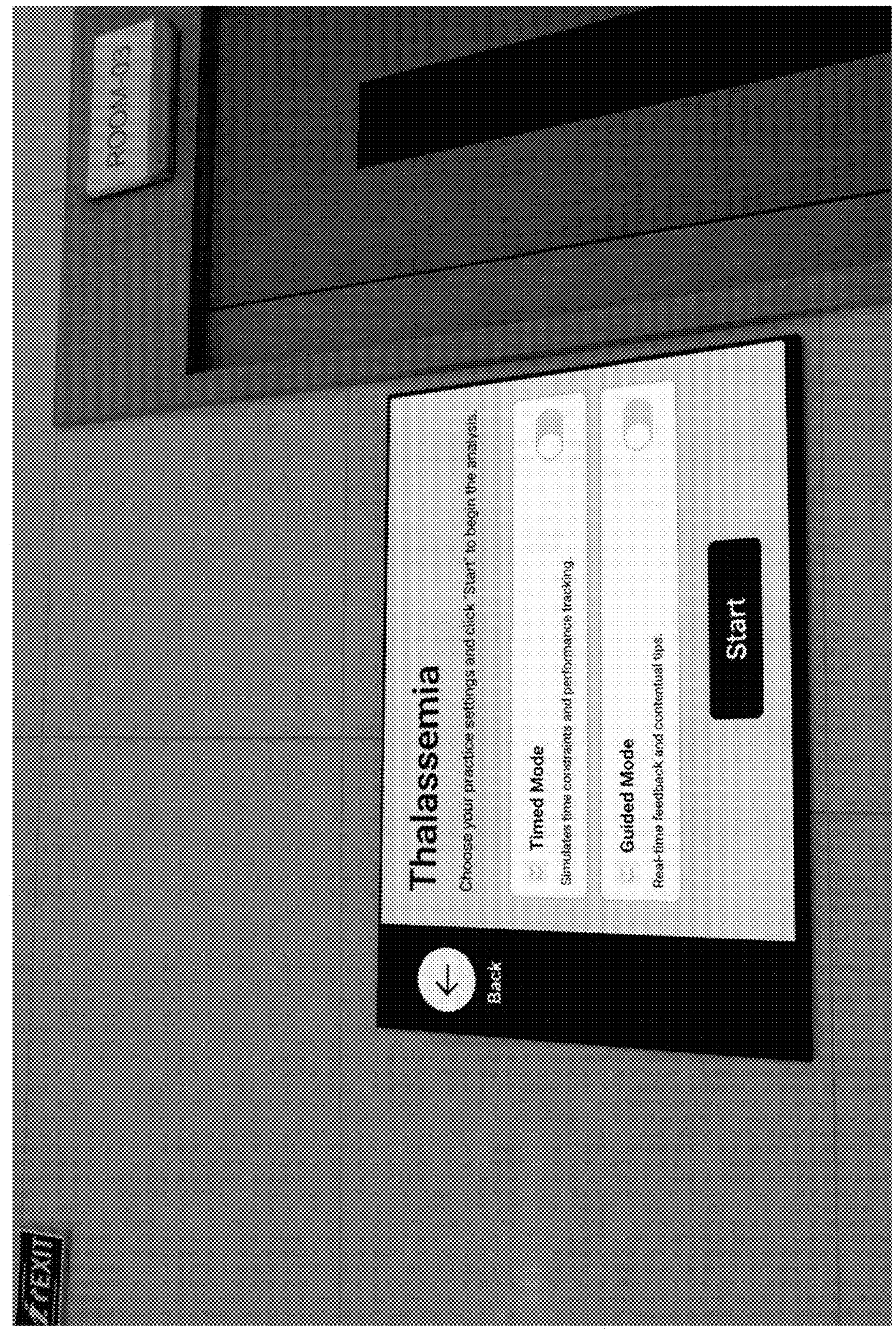
FIG. 9 illustrates an example case door interface presenting case identification information and selectable station settings including a guided mode and a timed mode and a station start control.
Figure 10:
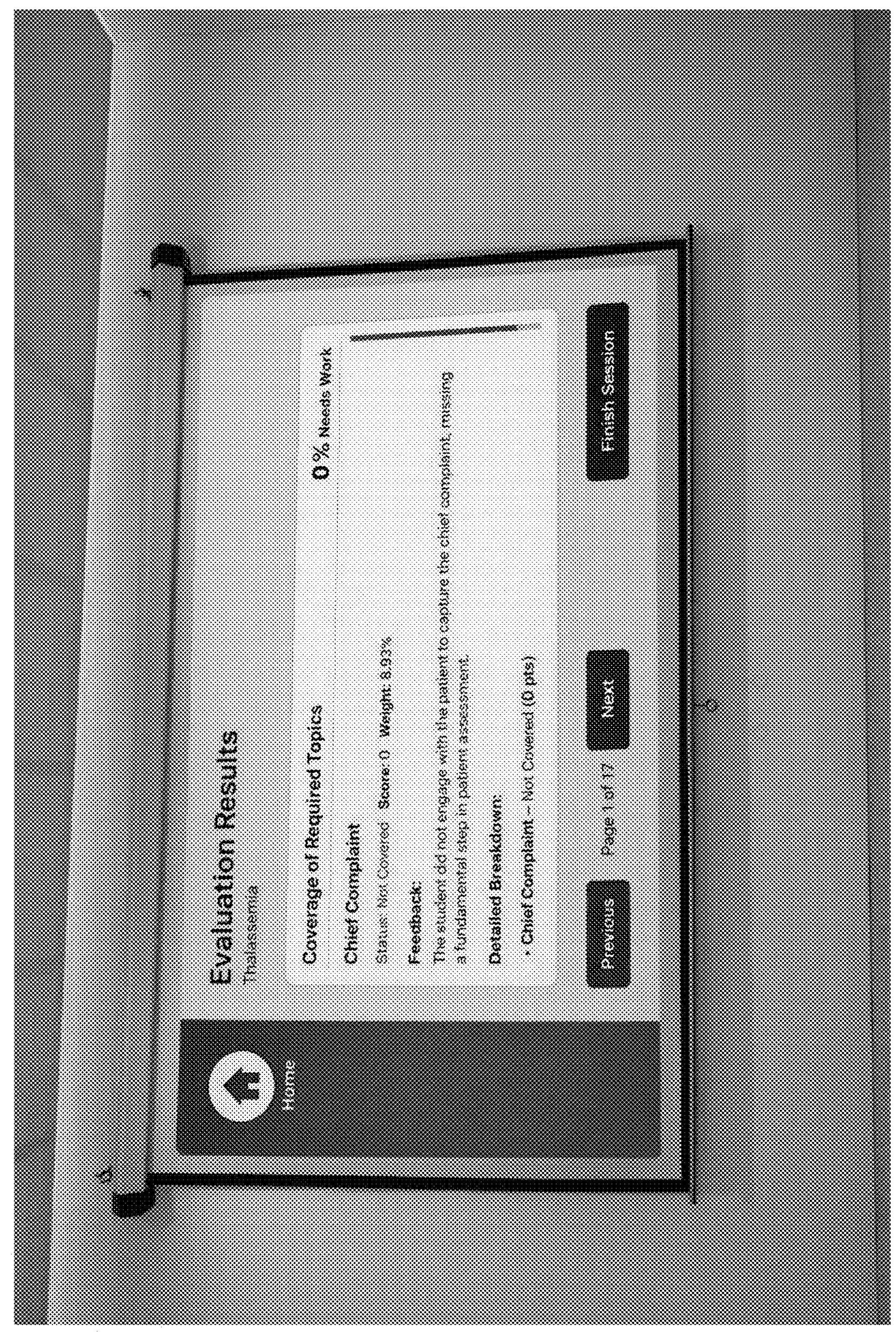
FIG. 10 illustrates an example evaluation results interface presenting feedback and a detailed breakdown of coverage of required topics including a chief complaint topic.
Figure 11:
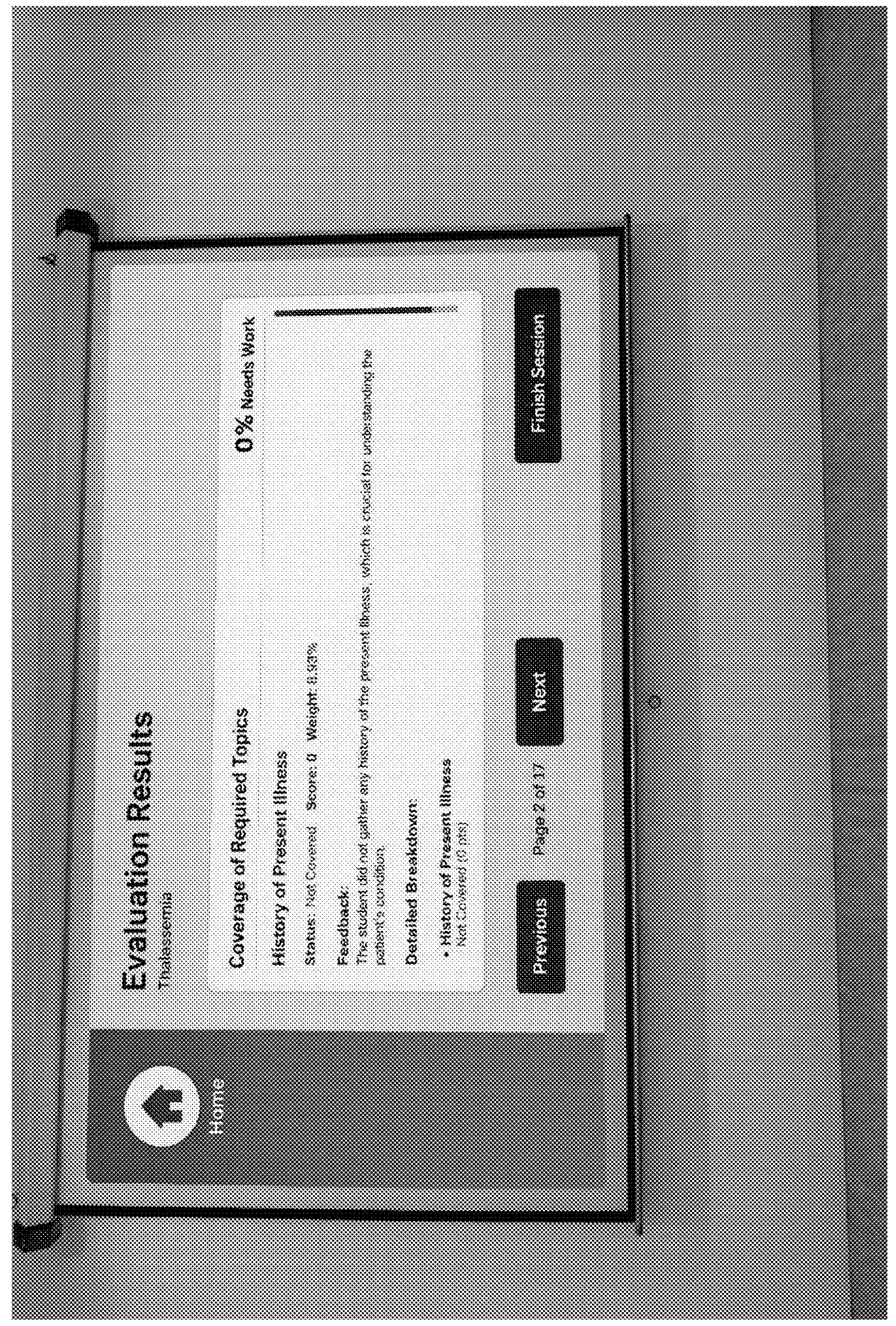
FIG. 11 illustrates an example evaluation results interface presenting feedback and a detailed breakdown of coverage of required topics including a history of presenting illness topic.
Figure 12:
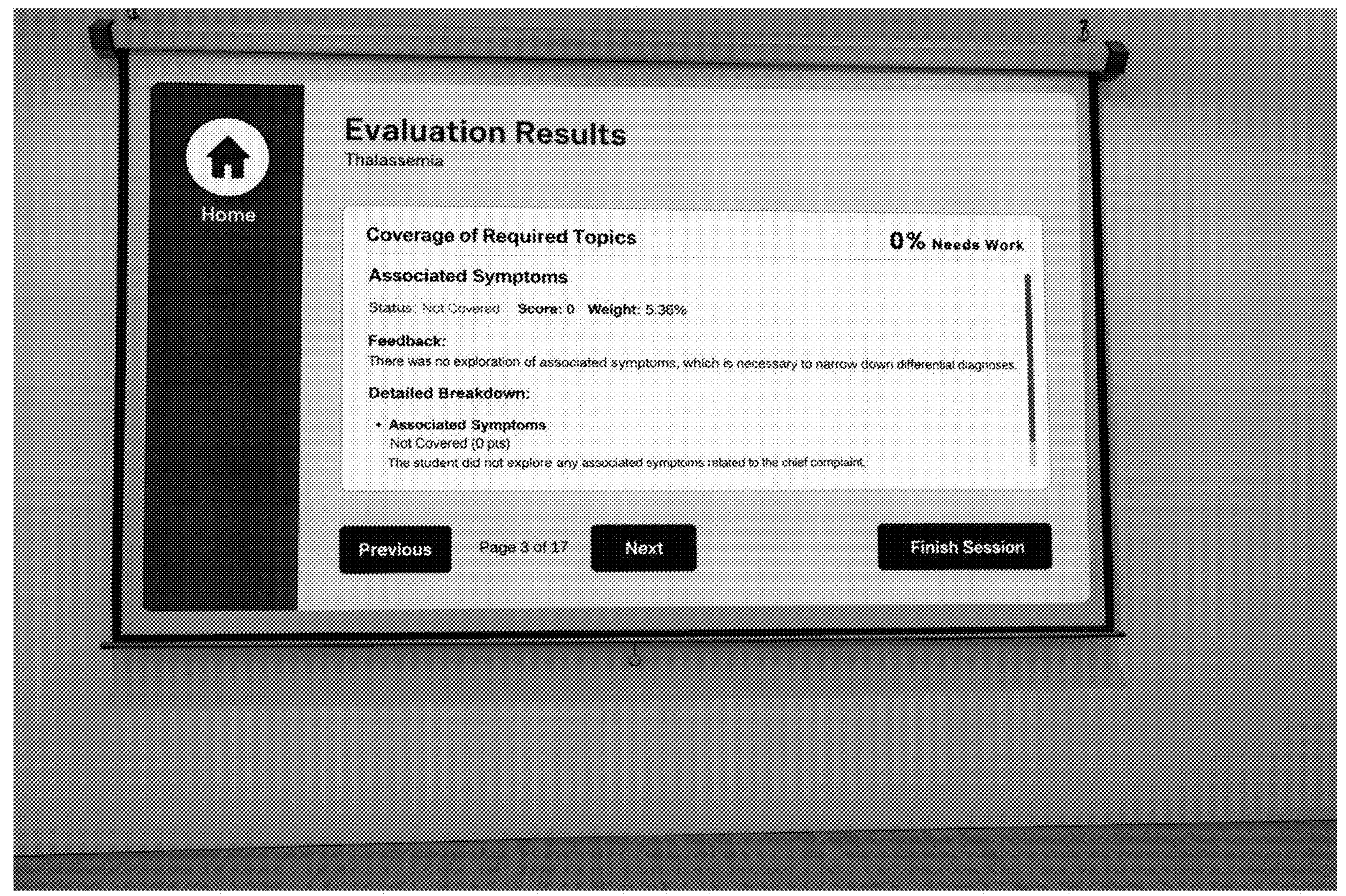
FIG. 12 illustrates an example evaluation results interface presenting feedback and a detailed breakdown of coverage of required topics including associated symptoms.
Figure 13:
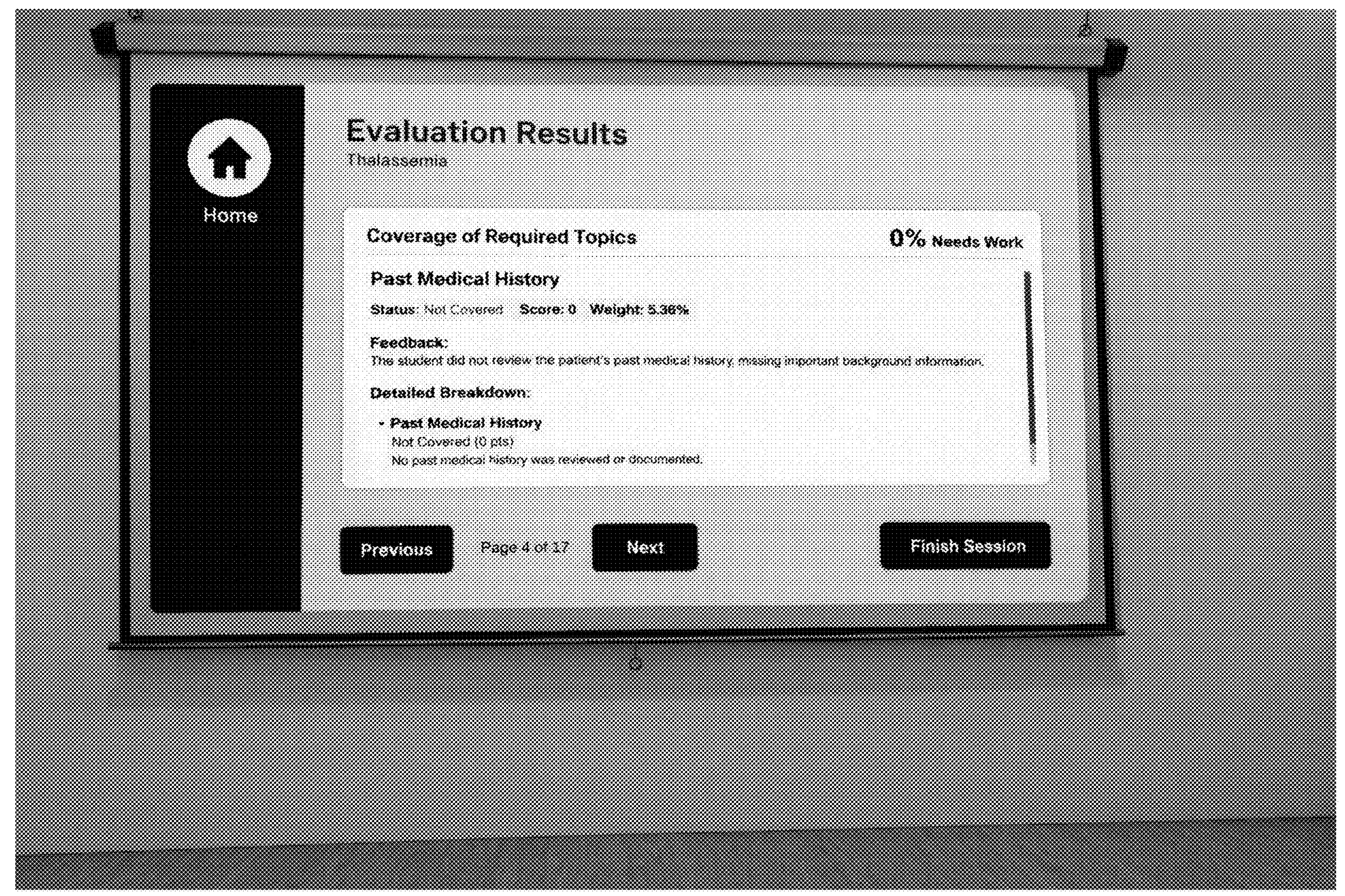
FIG. 13 illustrates an example evaluation results interface presenting feedback and a detailed breakdown of coverage of required topics including past medical history.
Figure 14:
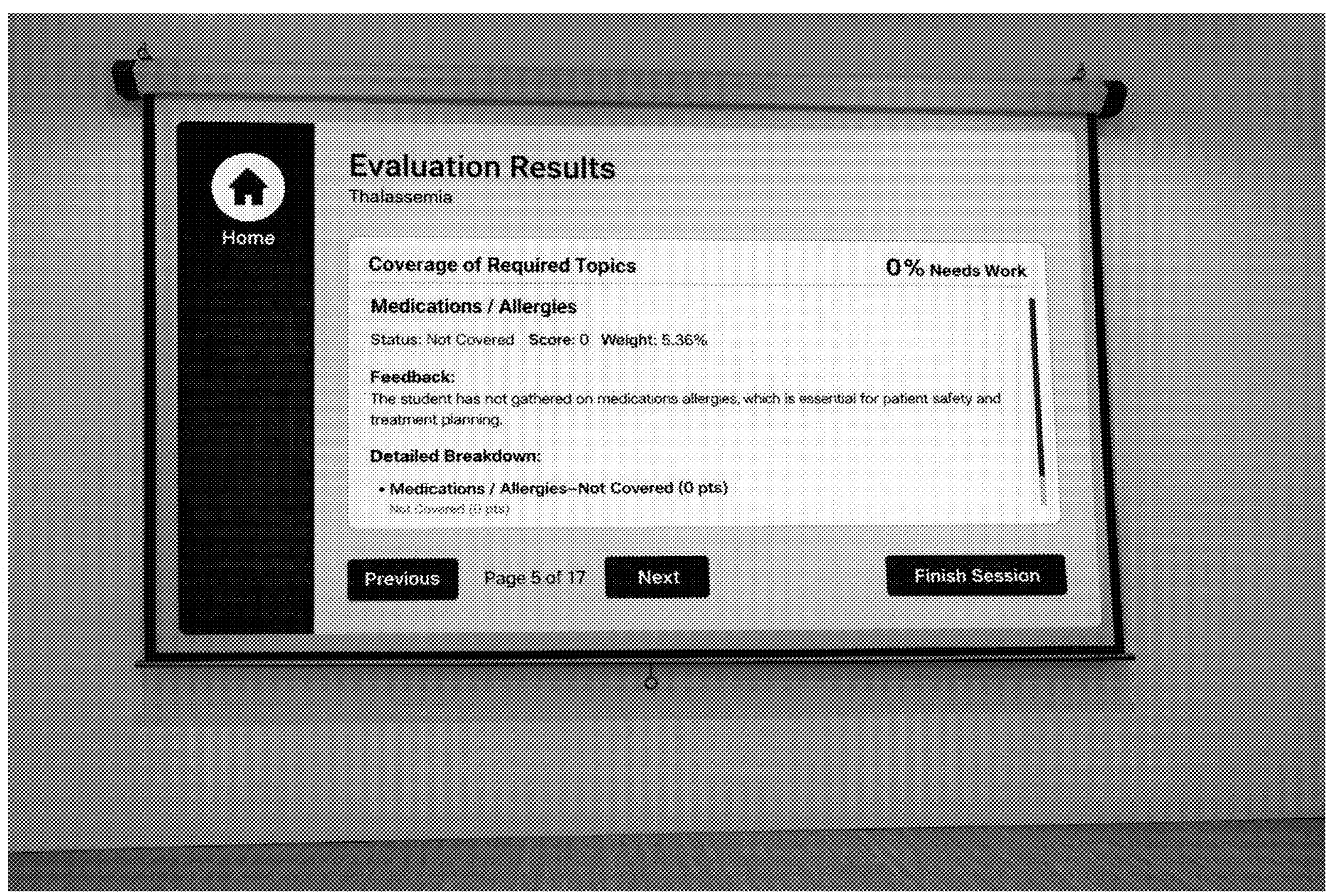
FIG. 14 illustrates an example evaluation results interface presenting feedback and a detailed breakdown of coverage of required topics including medications and allergies.
Figure 15:
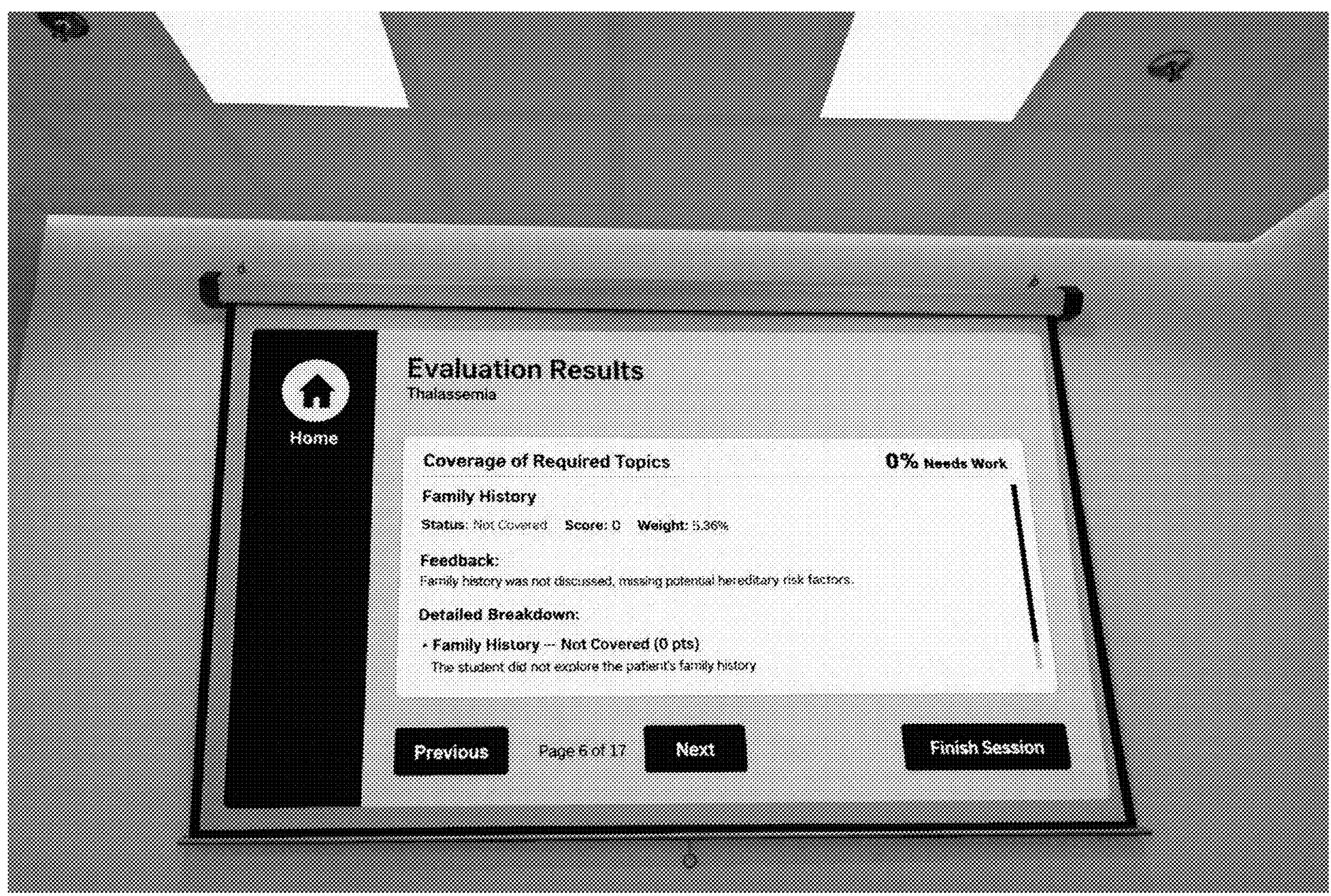
FIG. 15 illustrates an example evaluation results interface presenting feedback and a detailed breakdown of coverage of required topics including family history.
Figure 16:
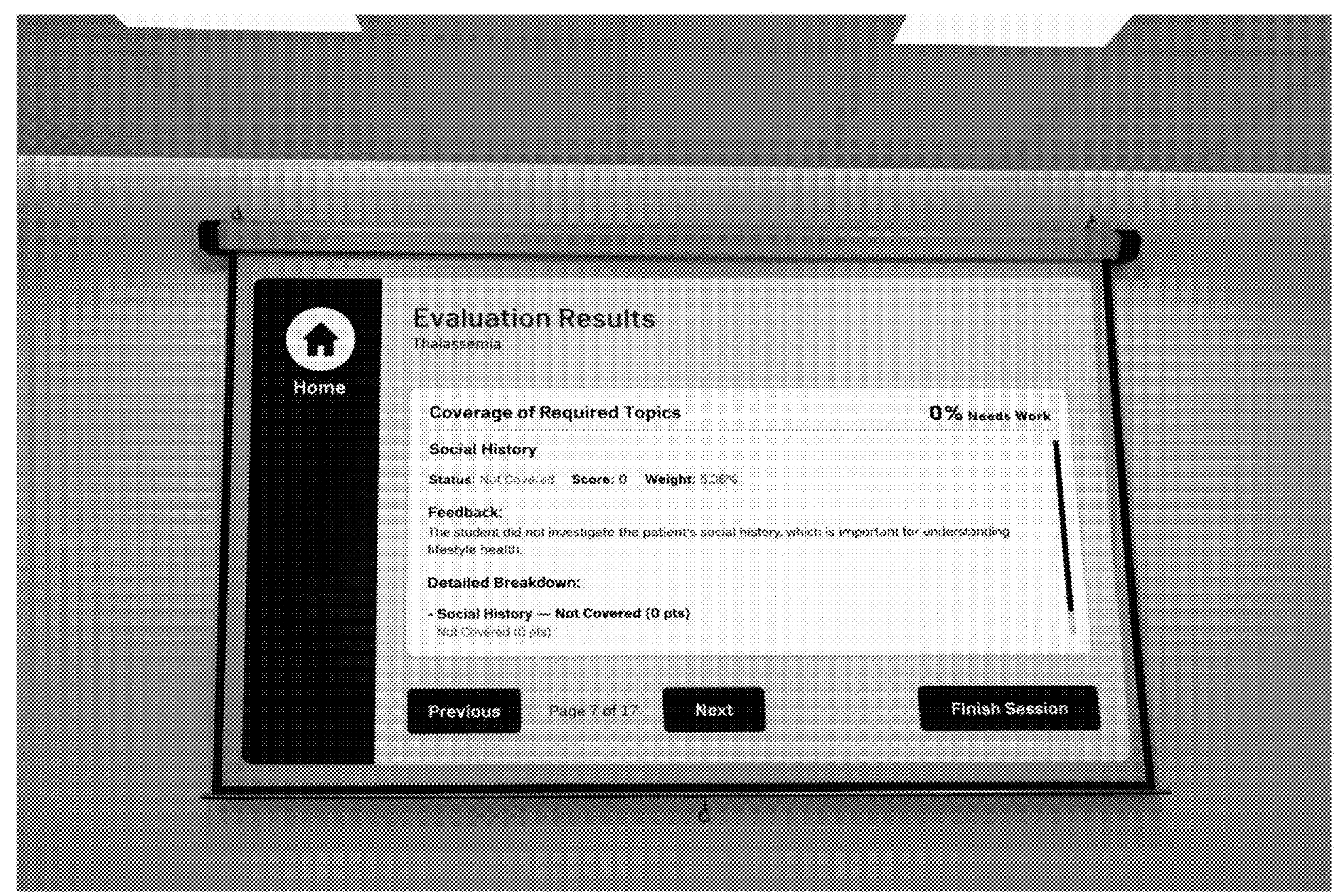
FIG. 16 illustrates an example evaluation results interface presenting feedback and a detailed breakdown of coverage of required topics including social history.
Figure 17:
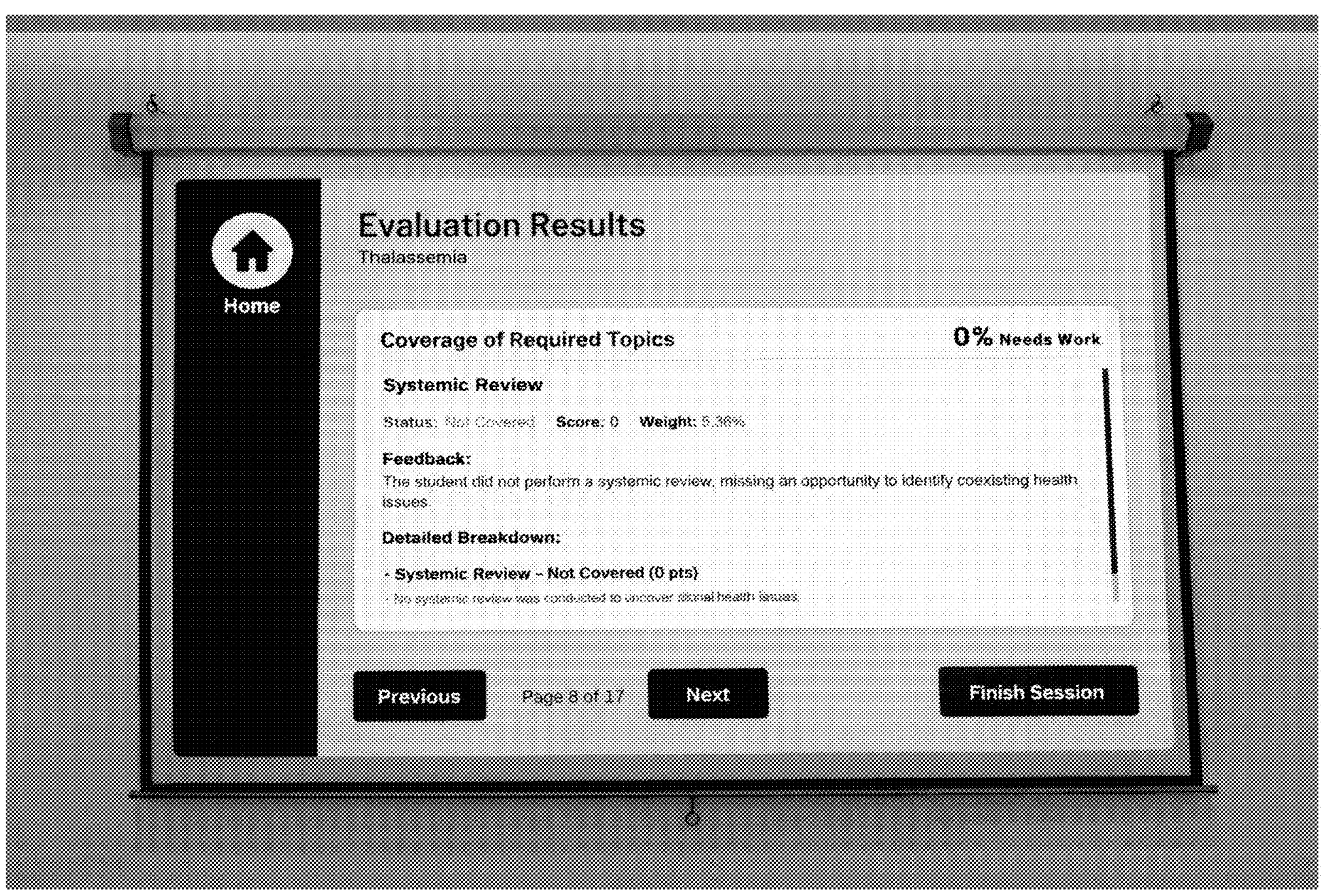
FIG. 17 illustrates an example evaluation results interface presenting feedback and a detailed breakdown of coverage of required topics including systemic review.
Figure 18:
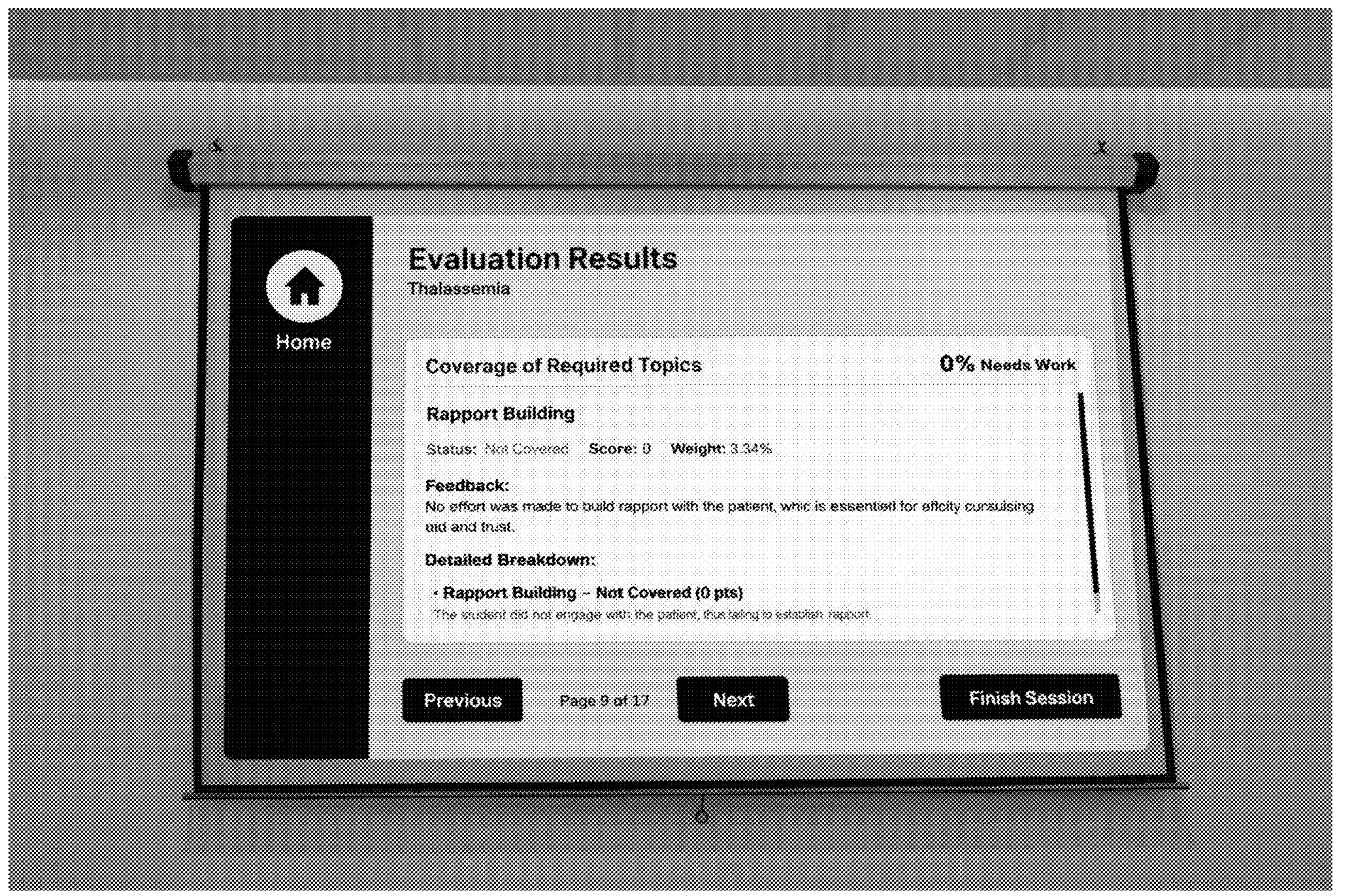
FIG. 18 illustrates an example evaluation results interface presenting feedback and a detailed breakdown of communication performance including rapport building.
Figure 19:
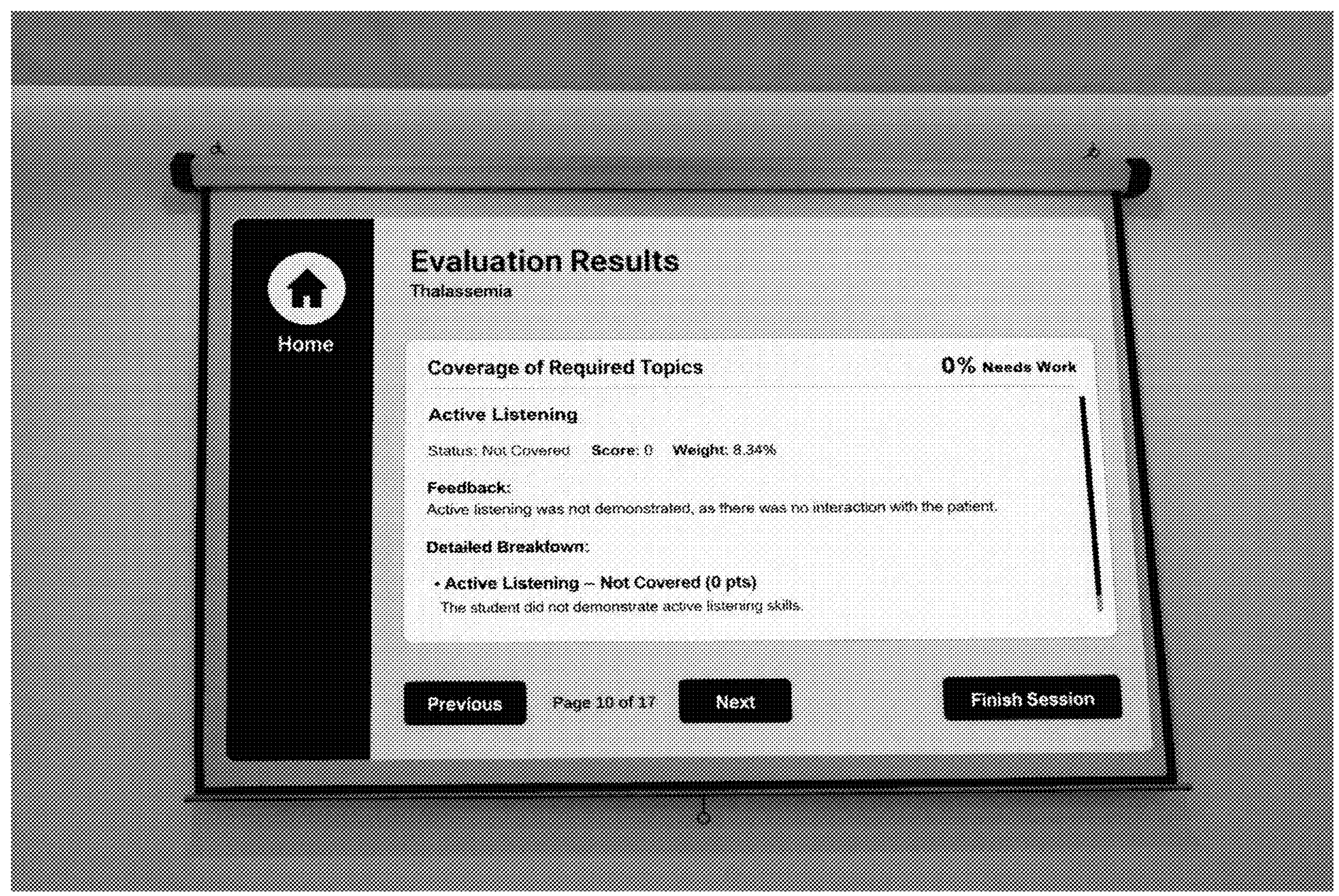
FIG. 19 illustrates an example evaluation results interface presenting feedback and a detailed breakdown of communication performance including active listening.
Figure 20:
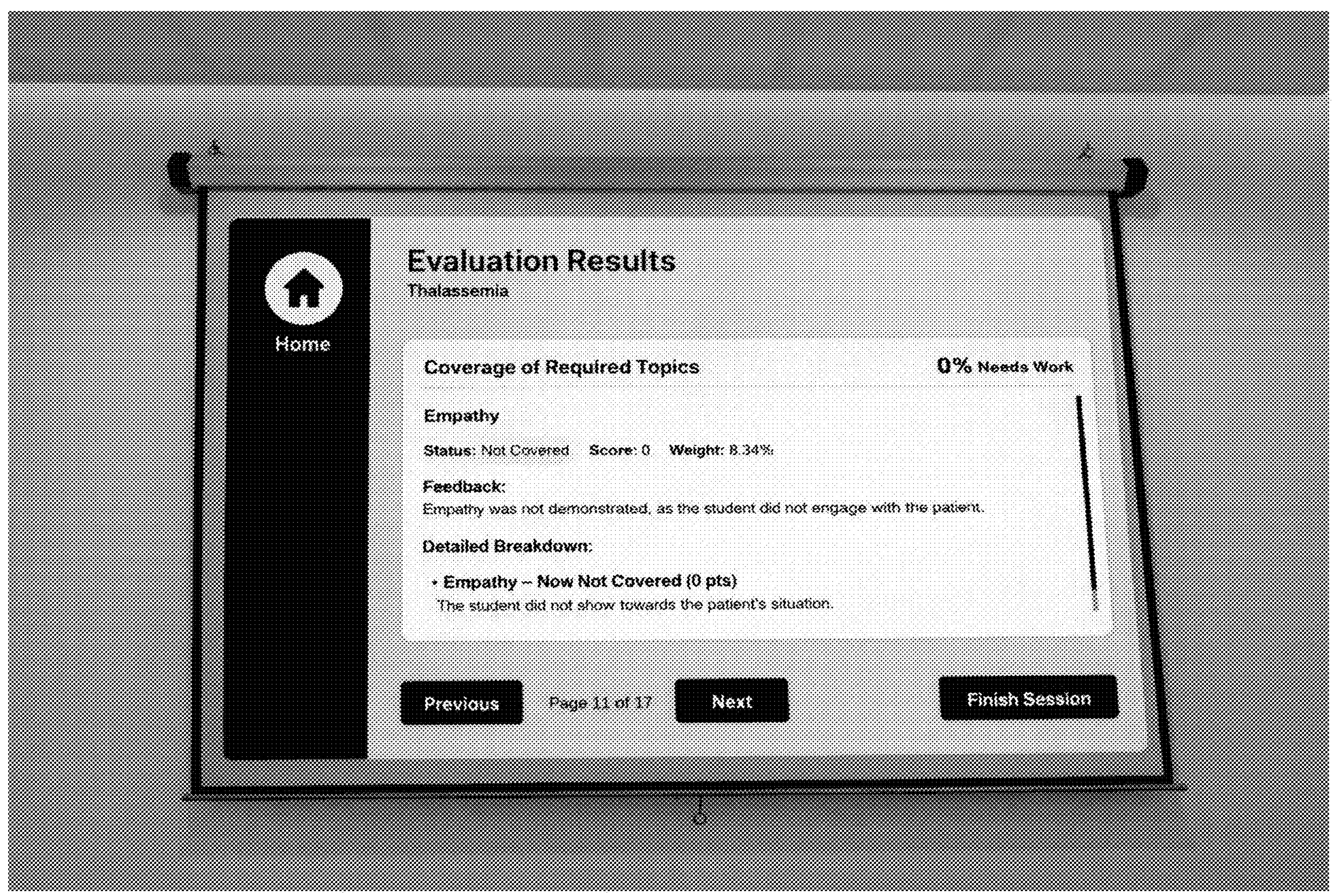
FIG. 20 illustrates an example evaluation results interface presenting feedback and a detailed breakdown of communication performance including empathy.
Figure 21:
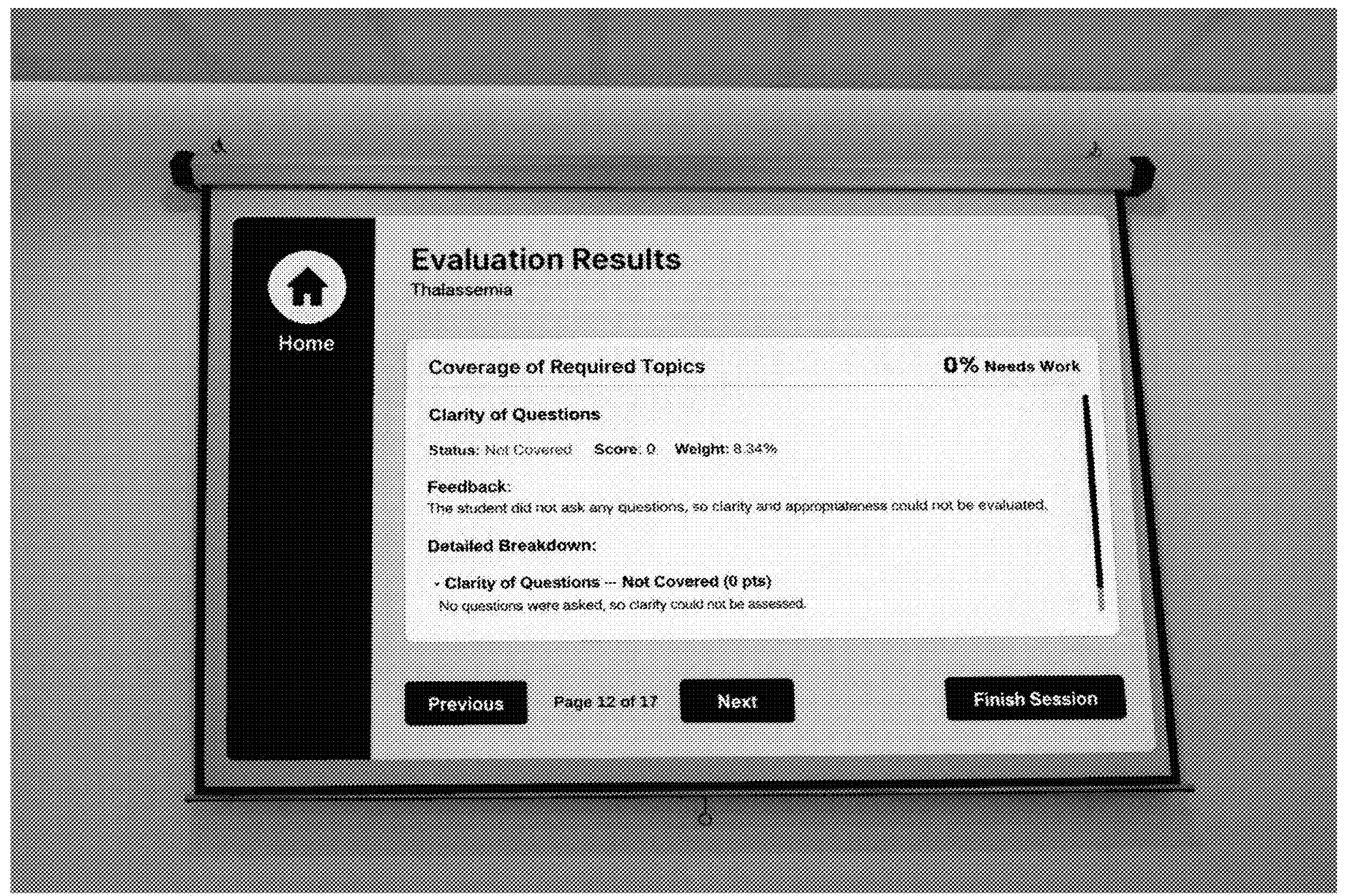
FIG. 21 illustrates an example evaluation results interface presenting feedback and a detailed breakdown of communication performance including clarity of questions.
Figure 22:
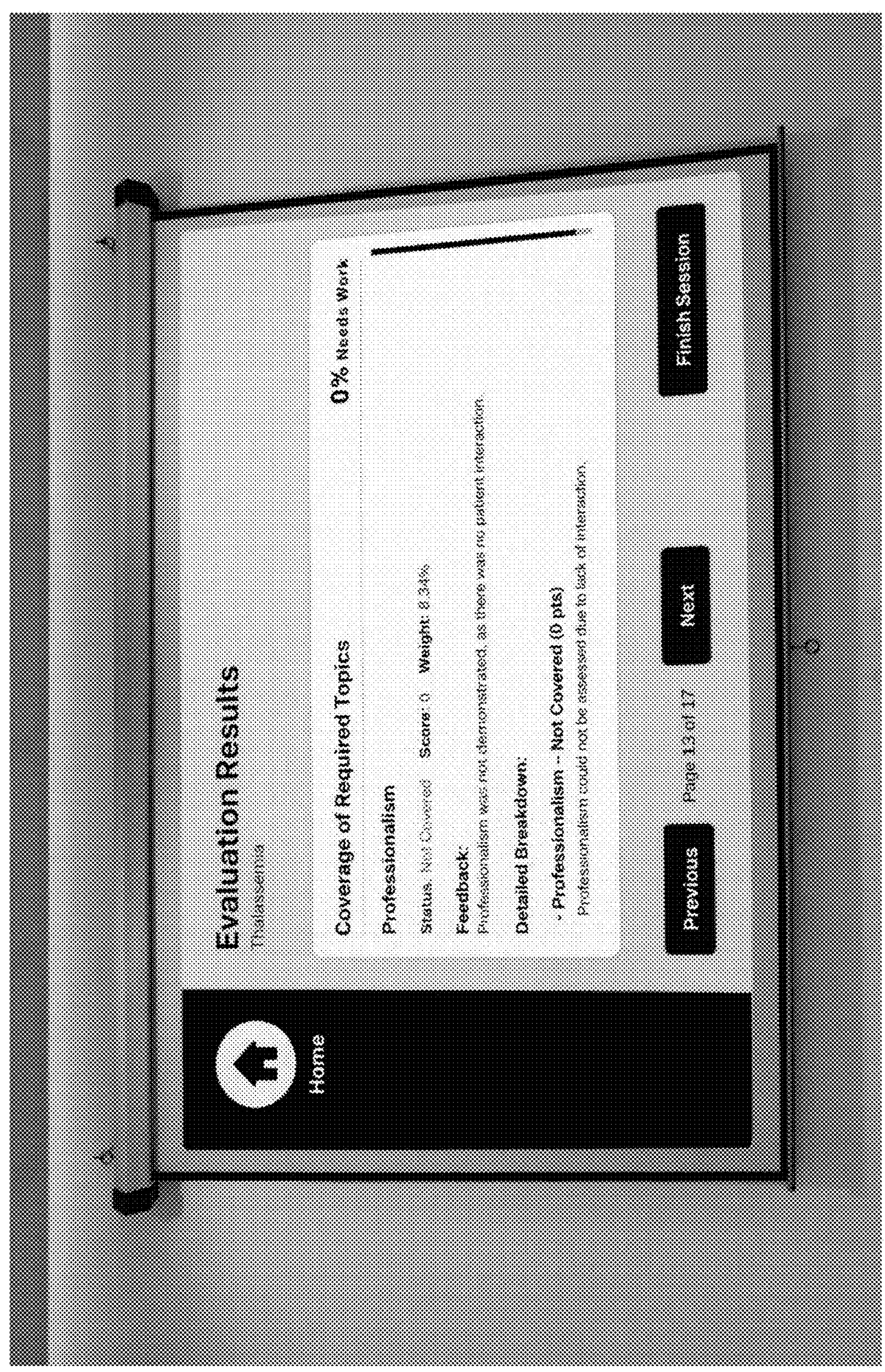
FIG. 22 illustrates an example evaluation results interface presenting feedback and a detailed breakdown of professional behavior including professionalism.
Figure 23:
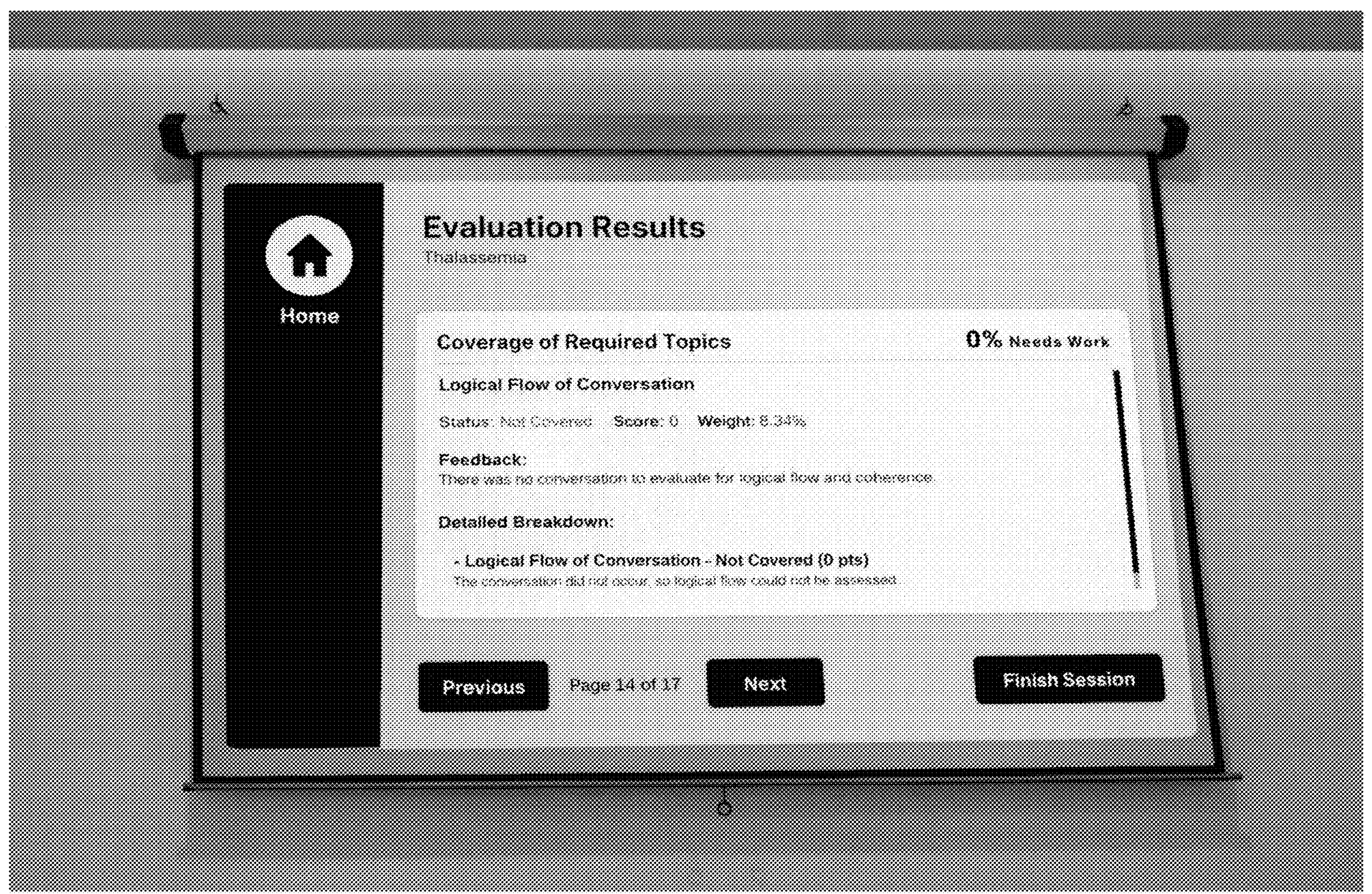
FIG. 23 illustrates an example evaluation results interface presenting feedback and a detailed breakdown of organization including logical flow of a conversation.
Figure 24:
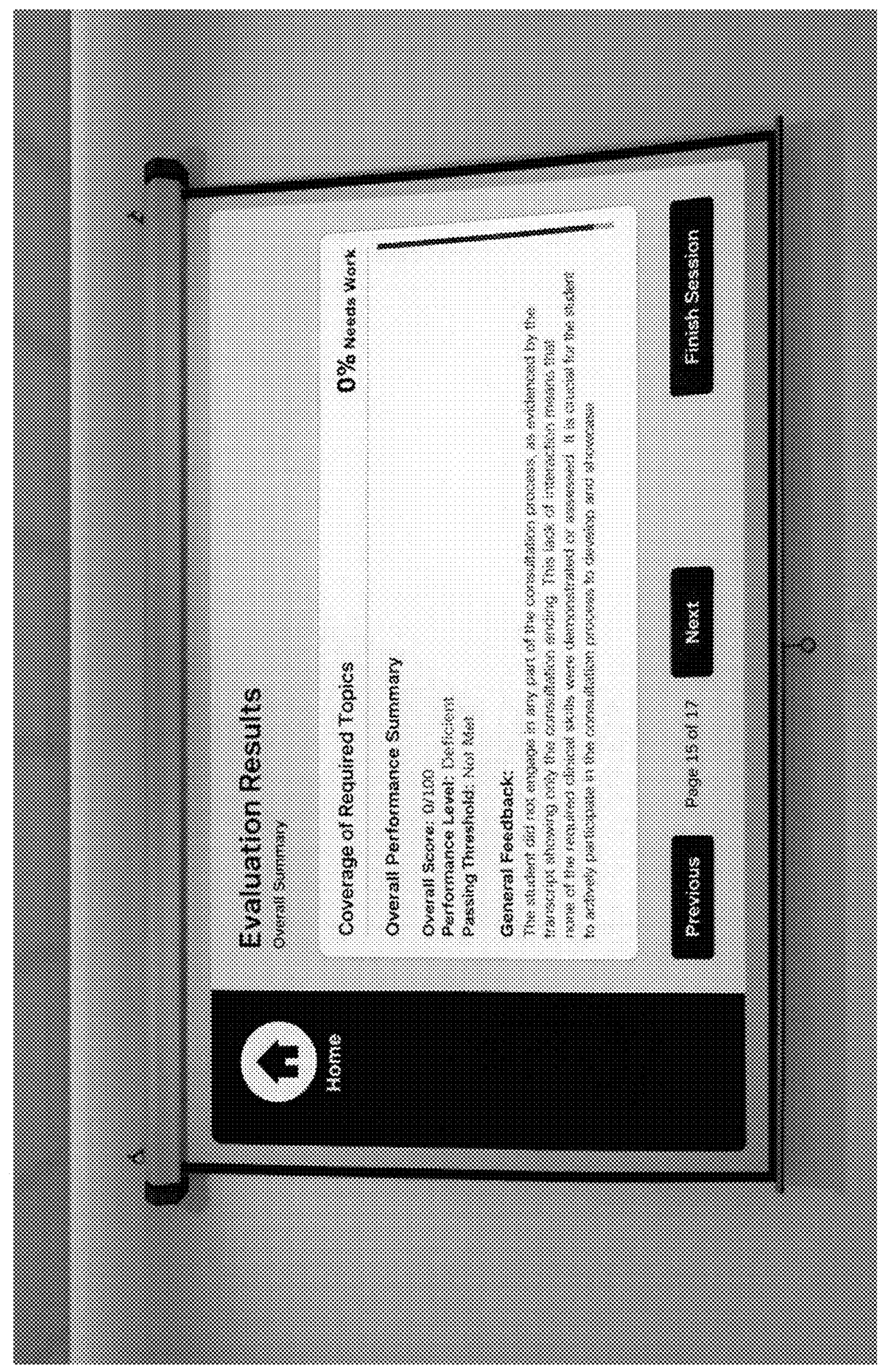
FIG. 24 illustrates an example evaluation results interface presenting an overall performance summary for an OSCE station.
Figure 25:
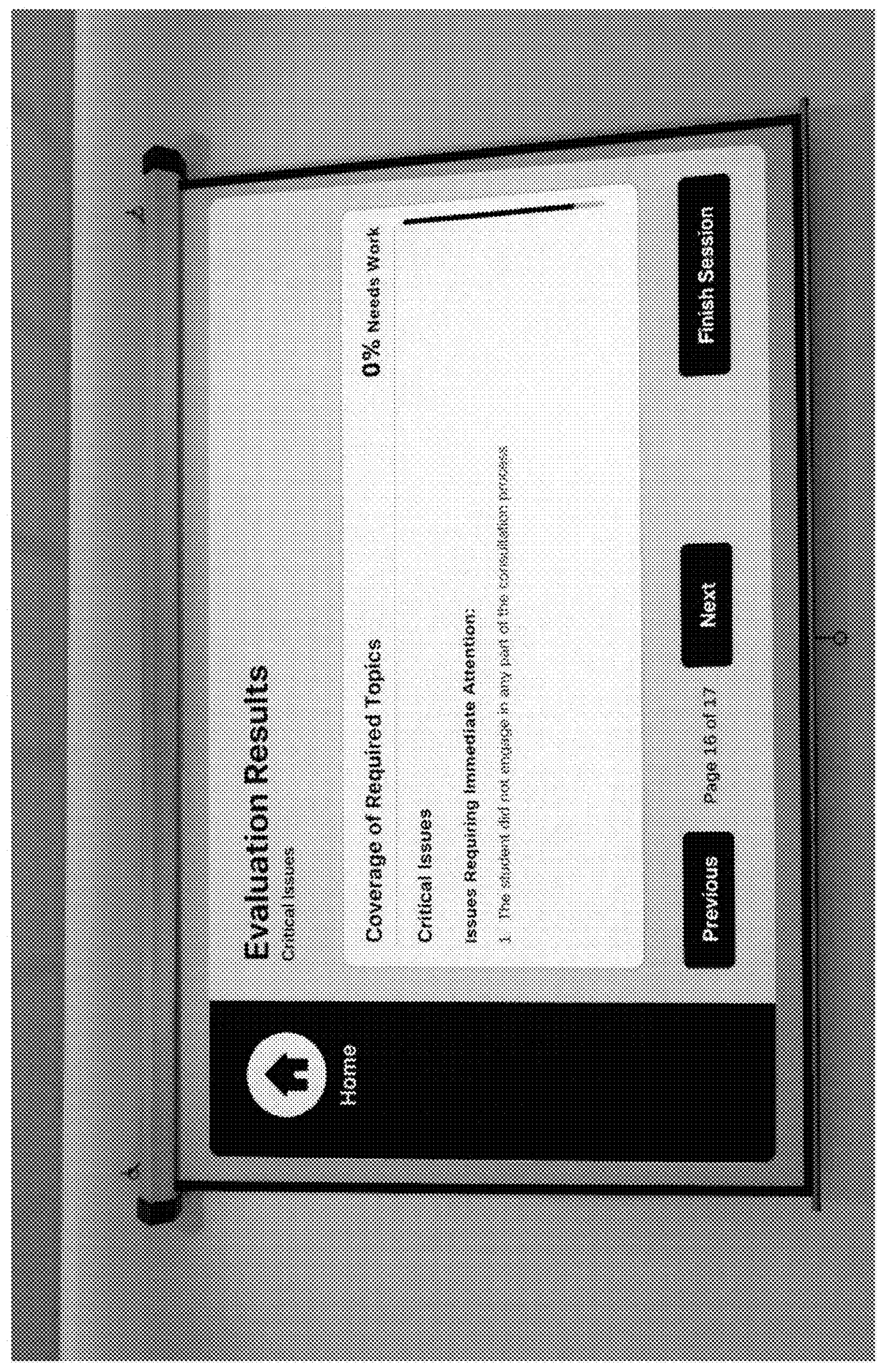
FIG. 25 illustrates an example evaluation results interface presenting critical issues identified during an OSCE station.
Figure 26:
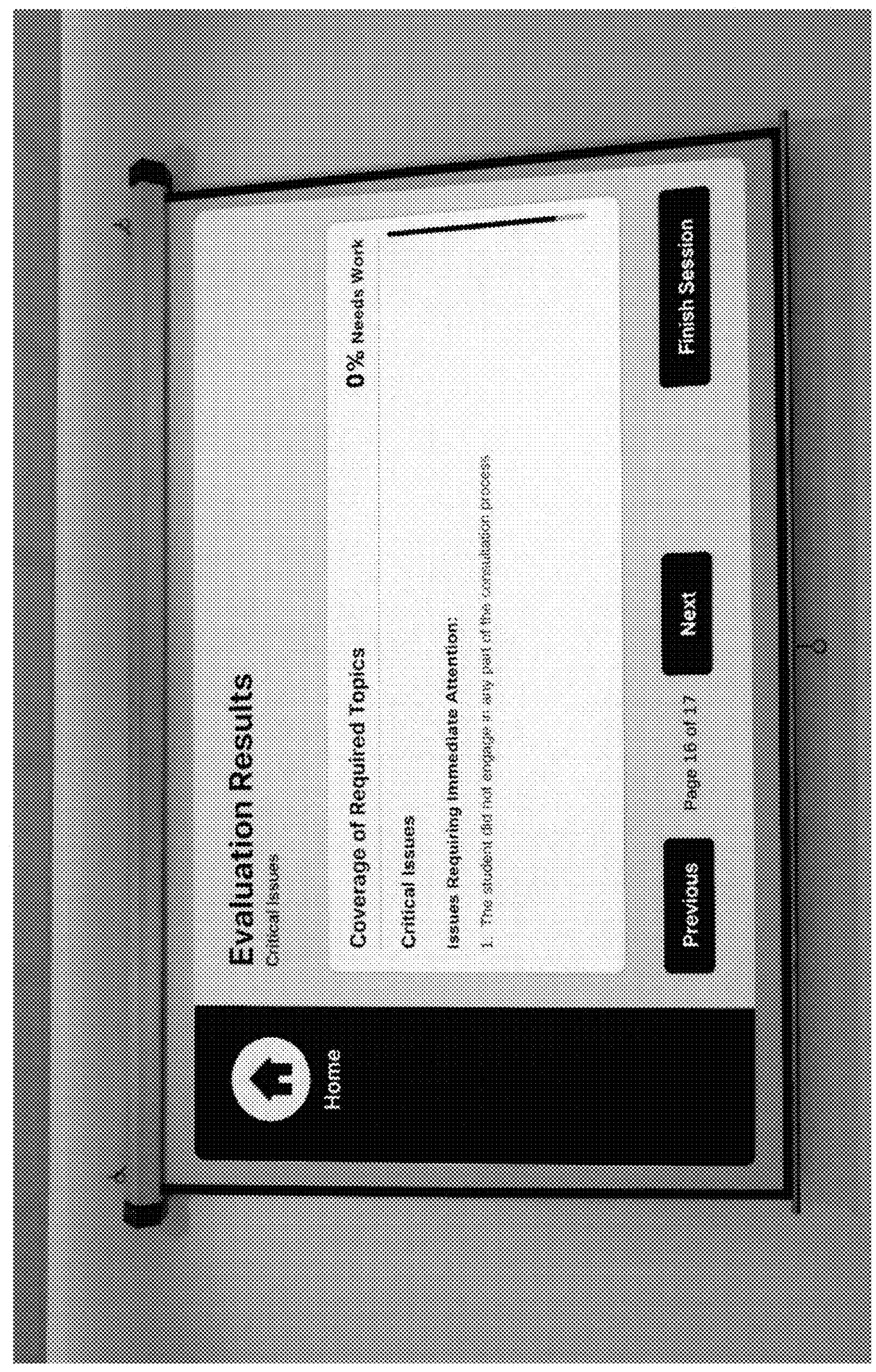
FIG. 26 illustrates an example evaluation results interface presenting areas for improvement and recommendations.

The VR client runtime further provides in-environment user interfaces for station menus, case selection, timers, prompts, and feedback indicators. FIGS. 7-9 illustrate example interfaces for selecting a professional area, selecting an OSCE practice category, and selecting station settings including guided mode versus timed mode.

The backend services may be implemented as a backend management system that provides centralized governance over user access, case definitions, evaluation criteria, AI behavior constraints, and reporting. In the illustrated example, the backend services include a session orchestrator, a scenario service, a virtual patient service, an analytics engine, and an examiner service, supported by data management and security subsystems.

The session orchestrator is configured to control a station session under server-authoritative timing and scenario state control. In certain embodiments, the session orchestrator maintains an authoritative clock and a session state machine and assigns authoritative timestamps to received events.

The scenario service is configured to store and deliver scenario definitions for OSCE stations and SOE stations, including case descriptions, question sets, timing rules, permitted interaction types, branch-graph state definitions, evaluation criteria, weights, and AI behavior constraints. In certain embodiments, the scenario service stores cases as versioned records having publication states to support approved, immutable case versions for runtime delivery.

The virtual patient service is configured to generate case-bound avatar responses for OSCE stations. In certain embodiments, the virtual patient service applies administrator-defined patient traits including emotional state, level of cooperation, communication style, and trust level, while remaining bounded to clinical facts of an approved case.

The examiner service is configured to support examiner-led question delivery and controlled interventions for SOE implementations and optional examiner observation and trigger injection for OSCE implementations. In certain embodiments, the examiner role is implemented by an AI-driven examiner avatar driven by a predefined question set, optionally supervised by a remote examiner interface.

The analytics engine is configured to score station performance and generate feedback and reports using rubric-aligned scoring based on normalized events and linked evidence tokens.

The data management subsystem stores authoritative case records, rubrics, weights, and configuration data, and stores session event logs and report artifacts. In certain embodiments, the learner device is prevented from directly accessing an authoritative database or object store and instead accesses case metadata, case content, and results only through authenticated backend interfaces.

The security subsystem provides authentication, authorization, audit logging, and secure transport controls. In certain embodiments, the backend management system validates user entitlements and issues a session-bound authorization mechanism used to authorize protected requests (case list, case content delivery, evaluation submission, and results retrieval), and the VR client clears local session data and protected case content upon logout, shutdown, or session expiration.

Figure 6:
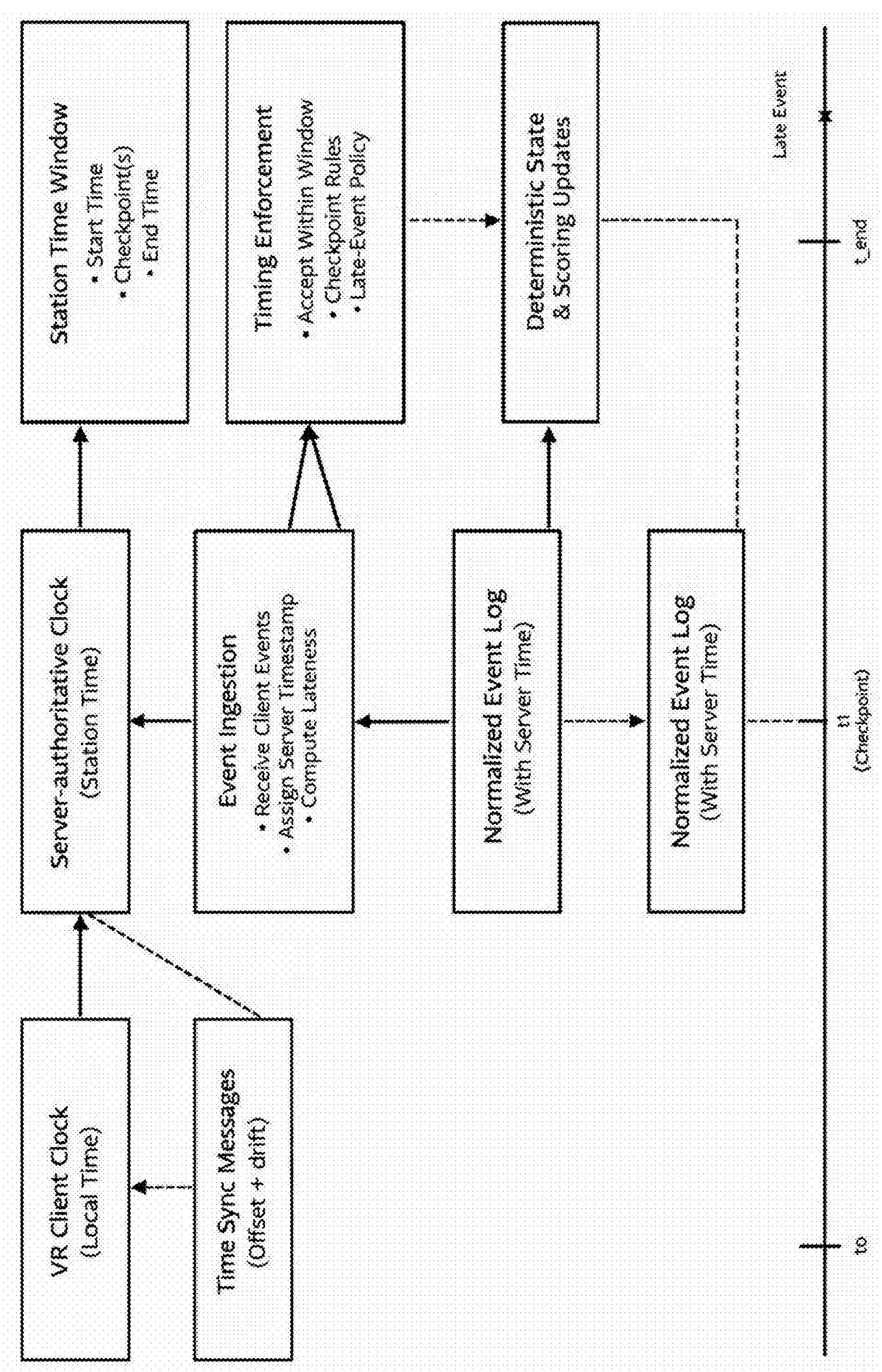
FIG. 6 is a diagram illustrating timing enforcement including server-authoritative clocks, synchronization messages, station time windows, checkpoint handling, and treatment of late events.

C. Session Orchestration, Server-Authoritative Timekeeping, and Timing Enforcement In certain embodiments, the session orchestrator is server-authoritative with respect to station timekeeping, event ordering, and scenario state transitions. FIG. 6 illustrates representative timing enforcement logic.

In an example session start, the VR client requests initiation of a station session for a selected case. The session orchestrator initializes a session identifier, binds the session to an approved case version (if versioning is used), and communicates a station start time and a station time window to the VR client.

The session orchestrator maintains an authoritative clock and assigns authoritative timestamps to incoming events. In some embodiments, the VR client includes local timestamps in event messages, and the session orchestrator computes clock offset and drift estimates for display synchronization while retaining authoritative timestamps for ordering, scoring, and audit.

Station timing enforcement may include a pre-station reading period, a station duration window, one or more checkpoints, and termination conditions. In certain timed-mode implementations, the VR client renders a visible countdown timer and generates an audible or visual alert at a checkpoint (e.g., when two minutes remain) while the session orchestrator preserves authoritative timing for event ordering and scoring.

In some embodiments, the session orchestrator marks events received after a station end time as late events and excludes late events from scoring while preserving late events in an audit log.

In certain embodiments, the session orchestrator transmits periodic synchronization messages that allow the VR client and any examiner or observer interface to align displayed countdown timers and event timelines to the server-authoritative clock.

In certain embodiments, the session orchestrator enforces transitions between station phases (e.g., introduction, interview, physical exam, counseling, completion, and/or SOE question phases) based on elapsed time and/or completion conditions expressed in a branch graph.

Figure 5:
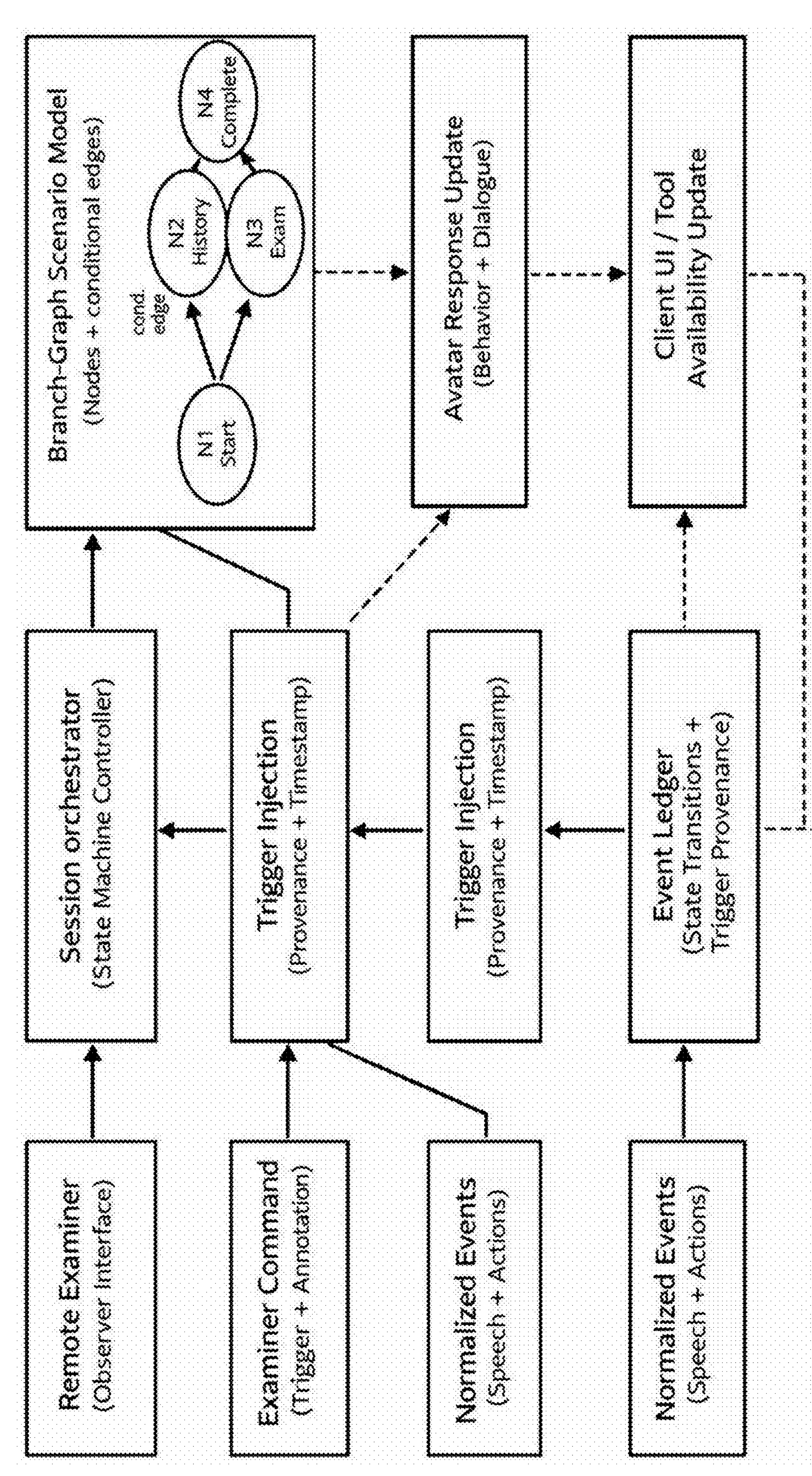
FIG. 5 is a diagram illustrating a branch-graph state machine architecture and examiner trigger injection, including scenario nodes, conditional edges, and state transitions driven by normalized events and examiner commands.

D. Branch-Graph Scenario State Machine, Trigger Handling, and Question Sequencing FIG. 5 illustrates a branch-graph state machine architecture in which scenario state is controlled by nodes and edges. The session orchestrator and scenario service cooperate to maintain a current node identifier representing a station state.

In certain embodiments, a branch graph includes: (i) a plurality of nodes, each node including state metadata defining available interaction affordances and presentation parameters; and (ii) a plurality of edges, each edge including a condition expression and a transition action.

A node may define, for example, which tools are enabled for an OSCE phase (e.g., enable a virtual stethoscope), what patient demeanor or symptom presentation is active, which examiner prompts are enabled, which SOE question is active, and which rubric items are active or emphasized for the phase.

An edge condition may reference one or more normalized events (e.g., a tool placement event at a body region for a minimum duration; a transcript segment mapped to a required-topic intent; an "end answer" control selection in SOE) and/or derived evidence tokens. Edge conditions may further reference timing conditions (e.g., after a checkpoint time) and/or examiner triggers.

The session orchestrator evaluates edge conditions in response to incoming normalized events and, when present, in response to examiner messages. When an edge condition is satisfied, the session orchestrator transitions the scenario state to a target node and transmits updated state information to the VR client and to relevant content services (e.g., a virtual patient service for OSCE stations and/or an examiner avatar module for SOE stations).

Examiner trigger messages may be used to inject controlled dynamic changes during a station. In OSCE stations, example triggers include condition worsens or patient becomes distressed. In SOE stations, example triggers include advancing to a next question, repeating a question, and revealing an investigation result. Examiner triggers are treated as first-class events and are recorded with provenance fields as described below.

In certain embodiments, the session orchestrator validates examiner messages by verifying examiner authorization and by verifying that the message type is permitted by scenario rules for a current node.

E. Multimodal Evidence Capture and Normalization

Figure 3:
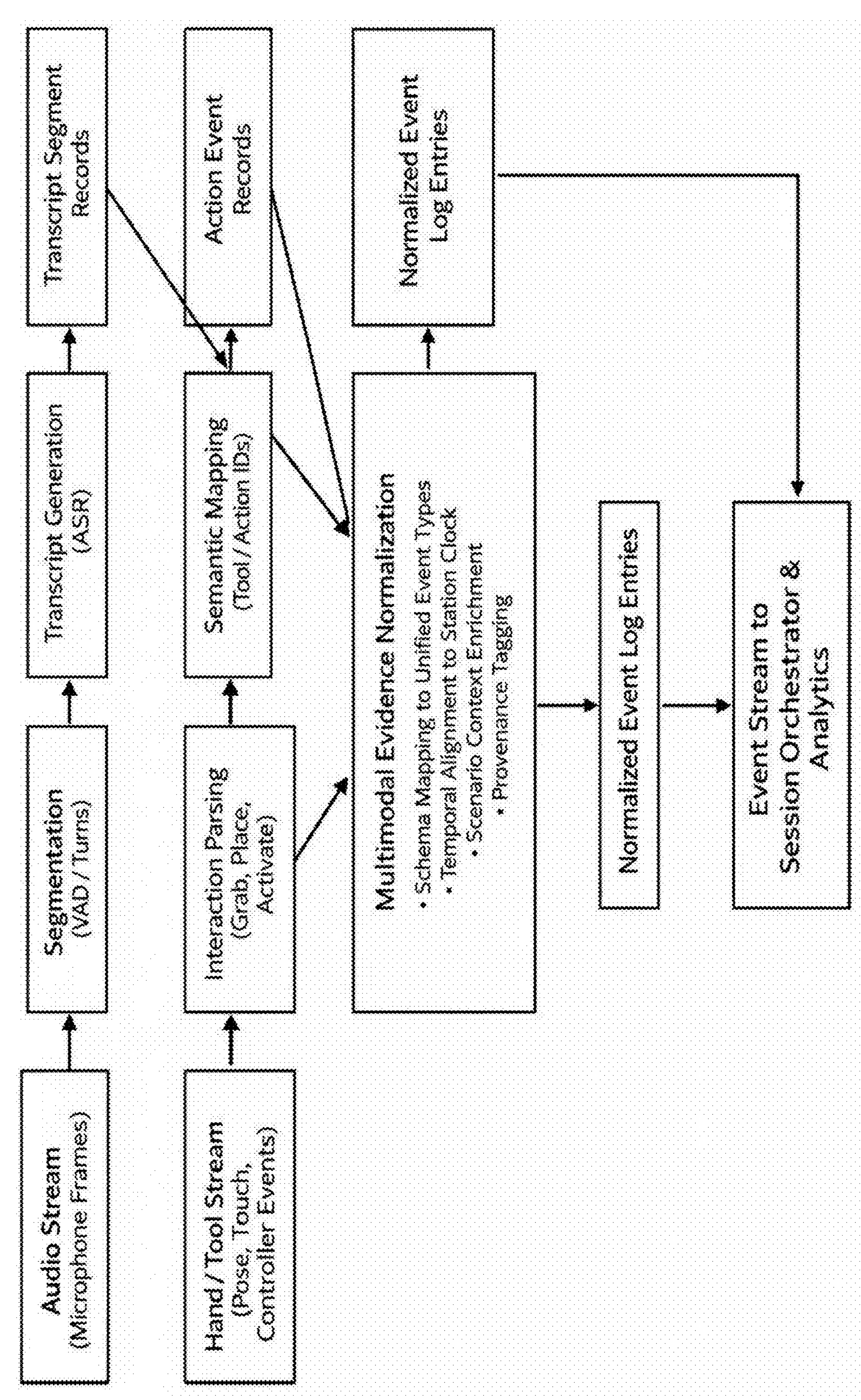
FIG. 3 is a pipeline diagram illustrating multimodal evidence capture and normalization including audio segmentation and transcript generation, tool-use/hand-action interpretation, semantic event mapping, and production of normalized event log entries.

FIG. 3 illustrates an evidence capture and normalization pipeline configured to transform raw speech and interaction telemetry into a unified event representation.

The VR client captures audio frames from a microphone. In certain embodiments, the audio frames are buffered into utterance windows using voice-activity detection (VAD) or other segmentation logic to produce utterance segments.

In certain embodiments, the system performs automatic speech recognition (ASR) to transform utterance segments into transcript segments. The ASR may execute locally on the learner device or as a backend-managed service. When a remote AI service is used for ASR, the backend management system may broker the request using session-bound authorization to avoid exposing persistent AI credentials on the learner device.

In certain embodiments, the system performs optional natural language understanding (NLU) on transcript segments to produce semantic labels such as intent tags, question types, required-topic coverage indicators, or other rubric-relevant indicators. In SOE stations, NLU may additionally classify portions of an answer as diagnosis statements, reasoning statements, management statements, or other answer components relevant to a question rubric.

The VR client captures raw action telemetry including controller/hand poses, object collisions, grab/release events, tool-use interactions, and interface selections. In SOE stations, action telemetry may additionally include selections such as an investigation request, a repeat-question request, and an end-answer selection.

In certain embodiments, an action interpretation module maps raw telemetry into semantic actions. For example, the module may detect that a virtual stethoscope was placed on a defined body region for a measured duration, or that a learner requested an investigation corresponding to a particular investigation identifier.

In certain embodiments, an event normalization module transforms transcript segments and semantic actions into normalized events expressed in a unified schema. Normalized events may be transmitted from the VR client to the session orchestrator and/or generated or re-timestamped by the session orchestrator.

In certain embodiments, a normalized event includes at least: (a) a session identifier; (b) an authoritative timestamp; (c) an actor identifier (e.g., learner, patient, examiner, system); (d) an event type; and (e) a typed payload.

In certain embodiments, a speech event payload includes a reference to one or more transcript segments and may include confidence scores and optional semantic tags. In certain embodiments, a tool-use or physical-exam-action payload includes a tool identifier, a body region identifier, a duration, and optional quality measures. In certain embodiments, an SOE question-prompt payload includes a question identifier and question text and/or a reference to an audio rendering of the question.

In certain embodiments, normalized events are appended to an ordered event timeline maintained by the session orchestrator. The timeline may be used for scoring, report generation, and synchronization of observer interfaces.

F. Rubric Ledger Data Structure and Update Algorithm

Figure 4:
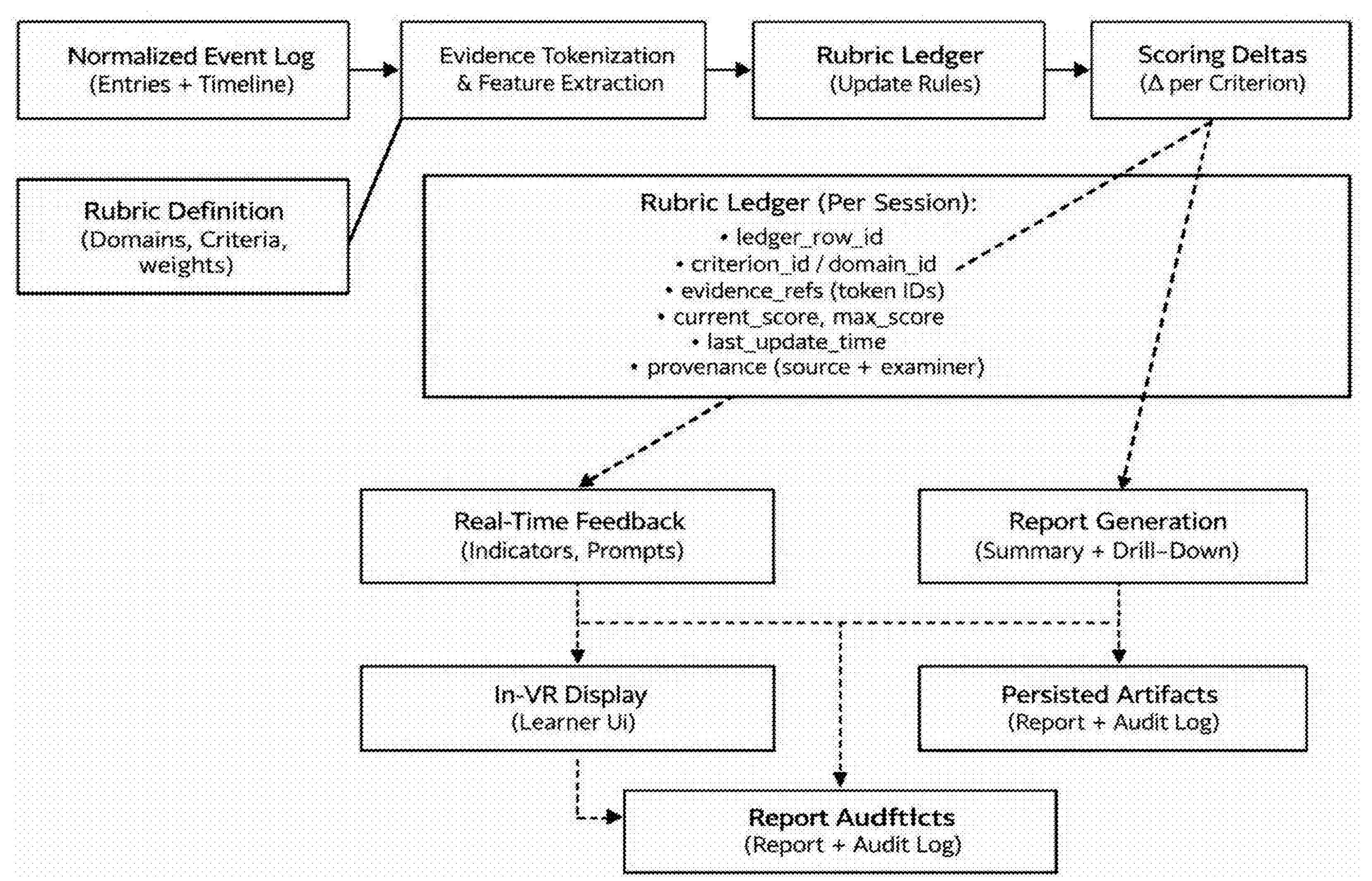
FIG. 4 is a diagram illustrating a rubric ledger data structure, ledger update rules, scoring delta computation, real-time feedback generation, and report generation.

FIG. 4 illustrates a rubric ledger architecture. In certain embodiments, an analytics engine maintains a rubric ledger comprising ledger entries for rubric items.

In certain embodiments, each ledger entry includes: (a) a rubric_item_id; (b) a domain identifier; (c) a weight; (d) a status value (e.g., unmet, partially_met, met); (e) one or more linked evidence tokens; (f) a score contribution; and (g) a last_updated timestamp. In SOE stations, a ledger entry may further include a question identifier and may track satisfaction status for required topics for a particular question.

In certain embodiments, the analytics engine generates evidence tokens by applying mapping rules to normalized events. A mapping rule may specify that a particular event type and payload pattern corresponds to a rubric item, a required topic, or contributes to a rubric feature.

In certain embodiments, the analytics engine performs temporal alignment between speech-derived evidence and action-derived evidence. For example, a scoring rule may consider whether particular history-taking intents occurred before or after certain examination actions, or whether an answer component occurred within a required time window after a question prompt in an SOE station.

In certain embodiments, ledger update rules execute as follows: for each normalized event received, (a) identify candidate rubric items impacted by the event; (b) generate one or more evidence tokens referencing the normalized event and any derived transcript segments; (c) update the status of each impacted rubric item according to rule logic and thresholds; and (d) compute a score delta reflecting the change.

In certain embodiments, the scoring logic aggregates rubric item scores into domain scores, required-topic coverage metrics, and an overall score. Domain scores may be presented with ratings and accompanied by narrative feedback generated using feedback templates and/or rule-based text.

In certain embodiments, the analytics engine transmits real-time feedback indicators to the VR client. Feedback indicators may include progress cues in guided mode, warning cues for time checkpoints, and/or post-action scoring deltas.

In certain embodiments, upon station completion, a report-generation module generates a report artifact and provides a report interface to the VR client. FIGS. 10-26 illustrate example OSCE report interfaces including required-topic coverage and communication and professionalism breakdowns. FIGS. 33-39 illustrate example SOE report interfaces including per-question scoring and required-topic coverage summaries.

G. Guided Mode Versus Timed Mode and Station Settings

In certain embodiments, the system supports station settings selectable by the learner and/or configured by an administrator. FIG. 9 illustrates an example interface including guided mode and timed mode controls.

In guided mode, the VR client may present contextual tips, prompts, or structured reminders to support learning objectives and may present additional real-time indicators of required-topic coverage. Guided mode may be used for practice sessions and formative assessment.

In timed mode, the VR client and the session orchestrator enforce realistic time constraints. In representative implementations, timed mode includes a pre-station reading period in which a case description is displayed (e.g., on a virtual door display) and a station time window for performance. In timed mode, the system may restrict access to hints, prompts, or pause controls.

In certain embodiments, the system supports multiple station types including an OSCE history-taking station and an OSCE clinical examination station, as illustrated by the selectable OSCE practice categories in FIG. 8.

FIGS. 7-9 further illustrate a representative OSCE access flow in which a learner selects a professional area, selects an OSCE practice category, reviews a case description at a virtual station door, and selects station settings including guided mode versus timed mode prior to starting a station session.

FIGS. 16-19 illustrate representative OSCE station environments in which the learner performs history taking and clinical examination actions using free-form speech and tool-use interactions. In certain embodiments, the learner uses virtual tools including a stethoscope, otoscope, and flashlight and interacts with a patient avatar within a rendered examination room.

FIGS. 10-15 and FIGS. 20-26 illustrate representative OSCE feedback reports generated from the rubric ledger, including required-topic coverage, domain-specific breakdowns for communication and professionalism, and narrative feedback mapped to evidenced actions and speech.

H. Examiner Observer Stream, Command Channel, and Provenance Logging

In certain embodiments, an examiner interface connects to the examiner service. The examiner interface may be implemented as a desktop application, a web interface, or another client, and may be used by a remote human examiner, an educator, and/or an administrator.

In certain embodiments, the examiner service provides a synchronized observer stream. In some embodiments, the observer stream includes a video or viewport stream of the learner's station view. In other embodiments, the observer stream includes a compact state/event stream sufficient to reconstruct station state for a spectator view.

In certain embodiments, the examiner service provides a command channel that receives examiner commands including triggers, question prompts, and annotations. Examiner commands may include a command type and parameters, and may include station-relative timing fields.

In certain embodiments, the session orchestrator logs examiner commands as event log entries with provenance fields. Provenance fields may include an examiner identifier, a role identifier, a device identifier, a command identifier, and an authoritative timestamp. This provenance information supports later audit and review of examiner actions and their effects on scenario state and scoring.

In certain embodiments, annotations generated by the examiner are stored as time-indexed records linked to the session timeline and optionally linked to specific rubric items or evidence tokens.

I. Scenario Authoring and Case Delivery

In certain embodiments, scenarios are authored using an administrator authoring interface that allows educators and examiners to define patient history, symptoms, expected responses, branching decision logic, timing rules, AI behavior constraints, and rubric definitions. In certain embodiments, authored scenarios are stored as versioned case records supporting draft, review, approval, and publication states.

In certain embodiments, OSCE scenario definitions include virtual patient dialogue behaviors, tool affordances, time constraints, and rubric criteria for history taking, examination technique, counseling, and communication.

In certain embodiments, SOE scenario definitions include a structured sequence of questions, expected-topic rubrics for each question, acceptable alternative answers, and one or more investigation assets that may be revealed responsive to a learner request or examiner control. FIGS. 27-32 illustrate example SOE selection and station interaction interfaces.

J. Representative Data Structures and Event Schema Examples

The following data structures are representative and illustrative of enabling implementations.

In certain embodiments, a ScenarioDefinition structure includes: scenario_id; specialty; level; supported station types including OSCE and SOE; supported modes; patient profile (if applicable); an examiner question set (if applicable); a branch_graph; tools_enabled; time_constraints; and a rubric reference.

In certain embodiments, a RubricDefinition structure includes: domains; rubric items; required topics; per-question scoring rules (for SOE stations); weights; and feedback templates.

In certain embodiments, an EventLogEntry structure includes: session_id; authoritative_timestamp; actor; event_type; payload; and optional provenance fields.

In certain embodiments, a SpeechTranscriptSegment structure includes: start_time; end_time; speaker; text; confidence; and optional semantic tags.

In certain embodiments, a PerformanceVector includes features derived from the event timeline and transcript segments, domain_scores, per-question scores (for SOE stations), and an overall score and rating.

In certain embodiments, evidence tokens include: a token_id; references to one or more EventLogEntry identifiers; references to one or more SpeechTranscriptSegment identifiers; derived features; and an association to one or more rubric items and, for SOE stations, an association to a question identifier.

K. Storage and Security

In certain embodiments, a data management subsystem stores scenario assets, versioned case records, session event logs, derived evidence tokens, rubric ledger states, domain scores, per-question scores, and report artifacts. In certain embodiments, runtime session artifacts are stored separately from authoritative case records to preserve immutability of approved cases.

In certain embodiments, access to case records and session artifacts is controlled by roles (e.g., learner, examiner, educator, administrator). Communications between the learner device and backend services may be encrypted using secure transport mechanisms. In certain embodiments, protected case content is delivered to the learner device only for an active session under a session-bound authorization mechanism and is cleared from local storage when the session ends, when a user logs out, or when a session token expires.

Specific security mechanisms and deployment details may vary by implementation and may be selected according to institutional requirements.

L. Backend Management, User Entitlements, and Case Governance

Figure 40:
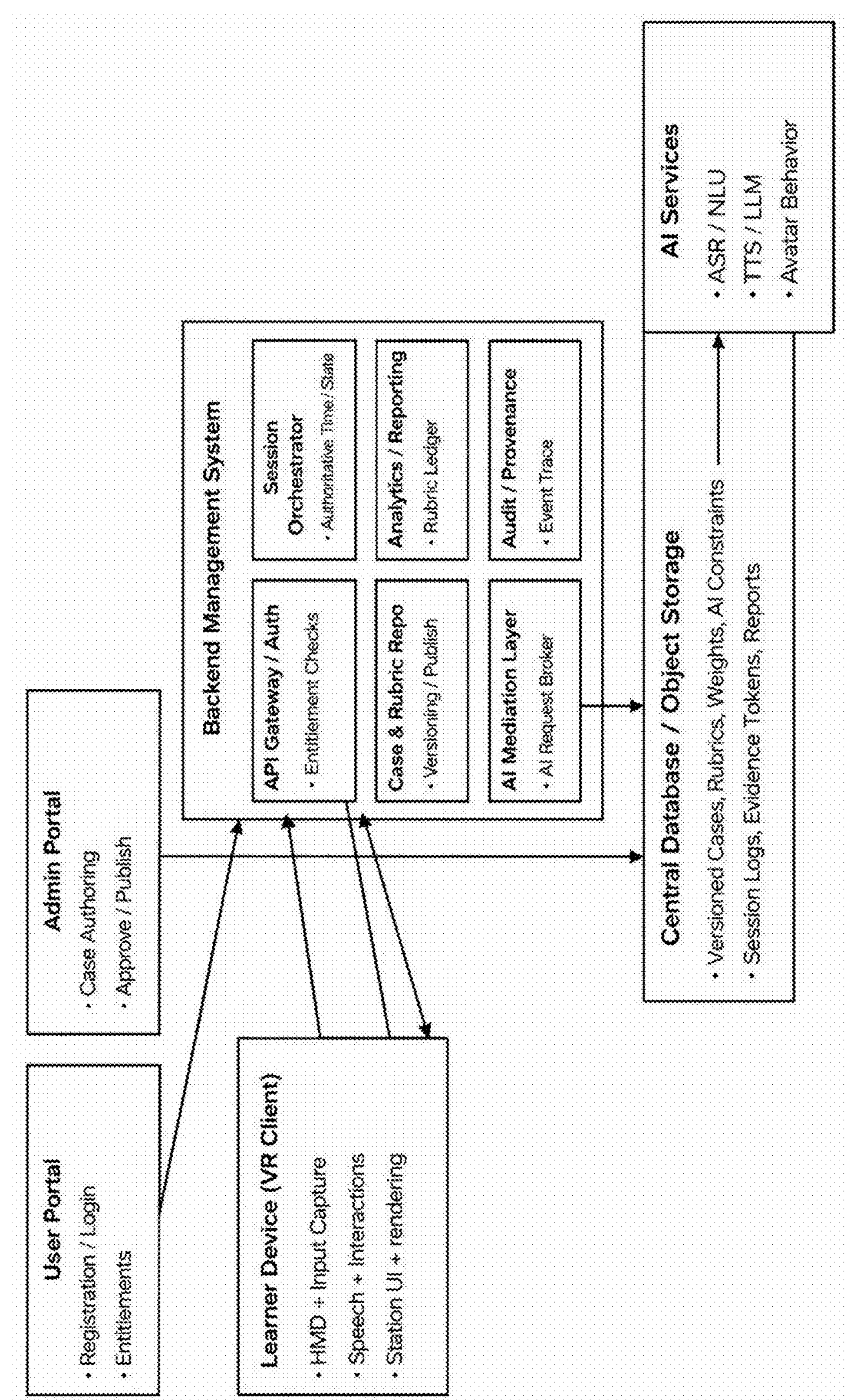
FIG. 40 is a diagram illustrating a backend management subsystem configured for entitlement-controlled access, case version governance, and session-bound delivery of case content and evaluation rules to a virtual reality client while preventing direct access from the client to an authoritative case repository and AI services.

FIG. 40 illustrates representative backend management functions for user entitlements and case governance. In certain embodiments, the backend management system provides authenticated application programming interfaces (APIs) through which the VR client requests case lists, retrieves case content, initiates station sessions, submits captured evidence, and retrieves evaluation results.

In certain embodiments, user entitlement management includes provisioning a user identifier, associating the user identifier with a subscription or institutional entitlement, and issuing a session-bound authorization mechanism (e.g., an access token having a validity period and scope) used to authorize protected operations. The backend management system may reject session initiation for a user lacking an entitlement for a selected station type, specialty, or case.

In certain embodiments, case governance includes authoring, validation, approval, and publication workflows. An administrator or educator may author a case in a draft state, submit the case for review, and publish an approved case version. In certain embodiments, an approved case version is immutable, and subsequent edits produce a new version identifier with a new approval workflow to preserve integrity of already-delivered assessments.

In certain embodiments, session initiation binds a station session to a specific approved case version identifier and to a specific rubric definition identifier, and session artifacts are stored with these identifiers for audit and reporting. Binding sessions to immutable versions allows consistent delivery across candidates and supports reproducibility of scoring when evaluation models or mapping rules are updated.

In certain embodiments, the backend management system mediates access to AI services used for avatar responses and/or speech and language processing. The VR client may transmit speech evidence and interaction evidence to the backend management system, which applies authorization checks, routes eligible requests to AI services using server-side credentials, and logs model versions and configuration parameters used during a session.

M. Structured Oral Examination (SOE) Station Flow and Evaluation

In certain embodiments, the system delivers an SOE station as a timed, structured question-and-answer assessment in which an examiner subsystem presents a plurality of clinical questions about a case and the learner answers by explaining diagnosis, clinical reasoning, and management. The examiner subsystem may be implemented as an AI-driven doctor examiner avatar driven by a predefined question set and evaluation rubric, optionally supervised by a remote human examiner.

Figure 27:
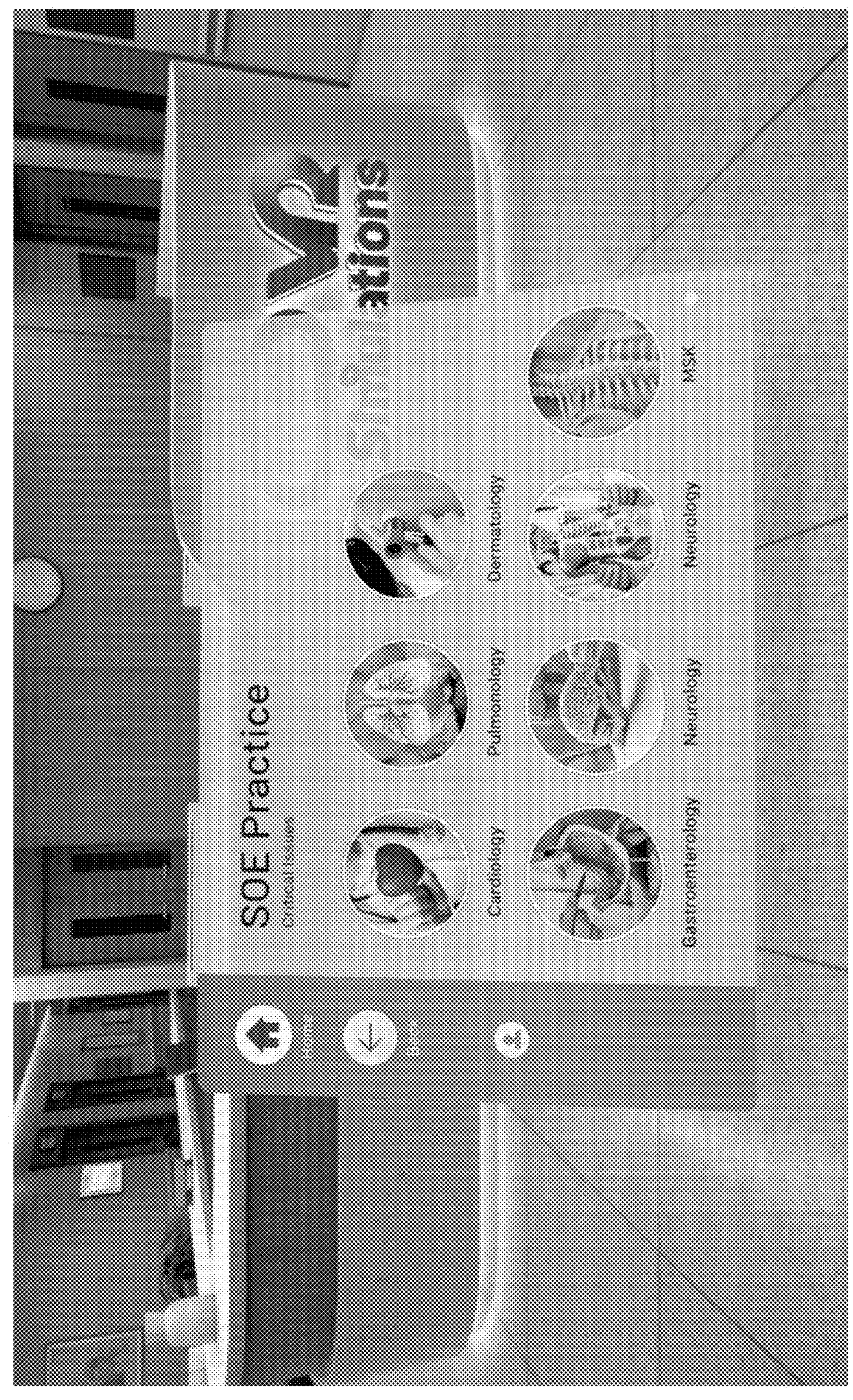
FIG. 27 illustrates an example SOE practice interface by which a learner selects a specialty and selects a case within the selected specialty.
Figure 28:
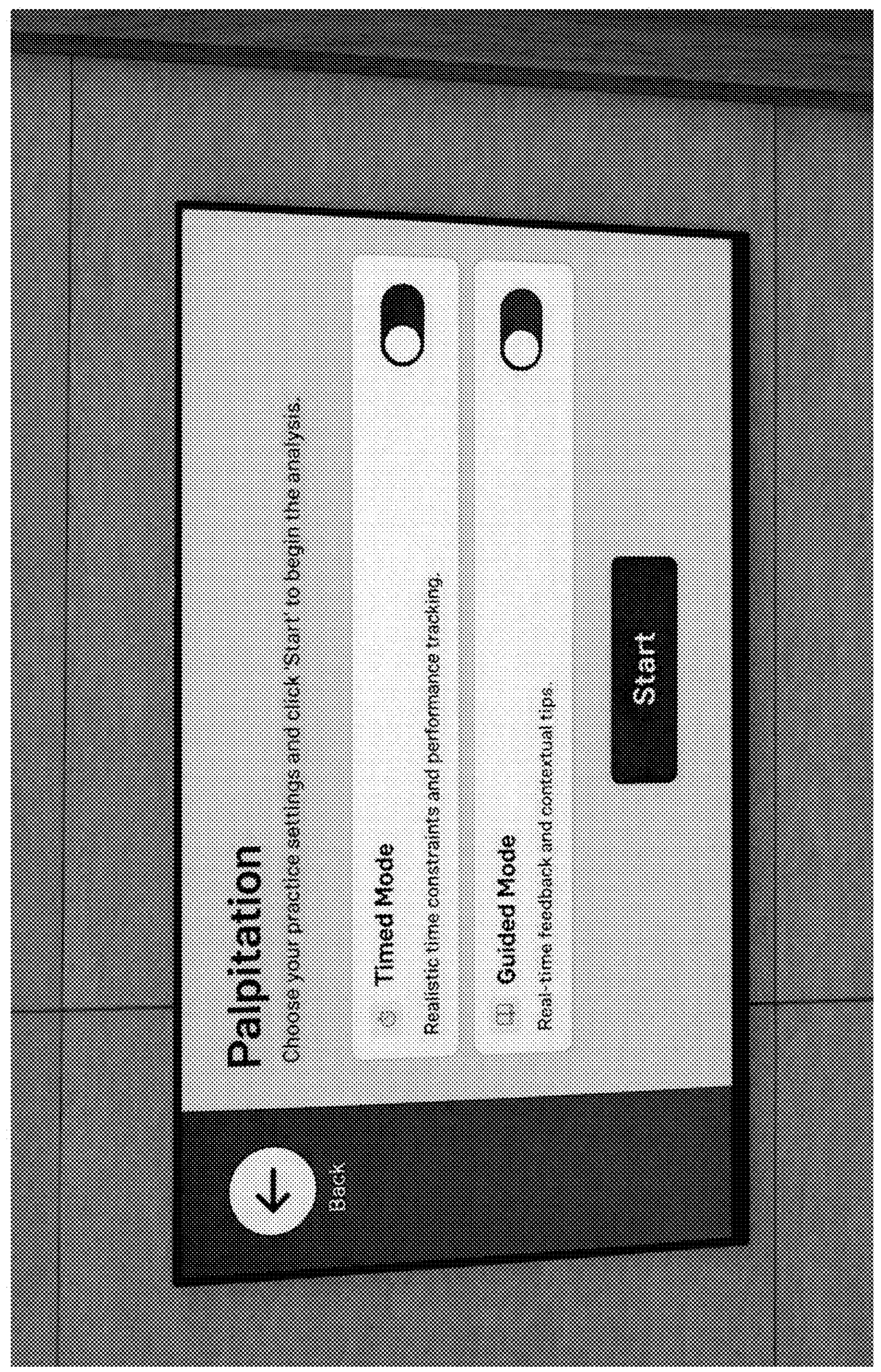
FIG. 28 illustrates an example SOE case door interface presenting selectable station settings including a guided mode and a timed mode and a station start control.
Figure 29:
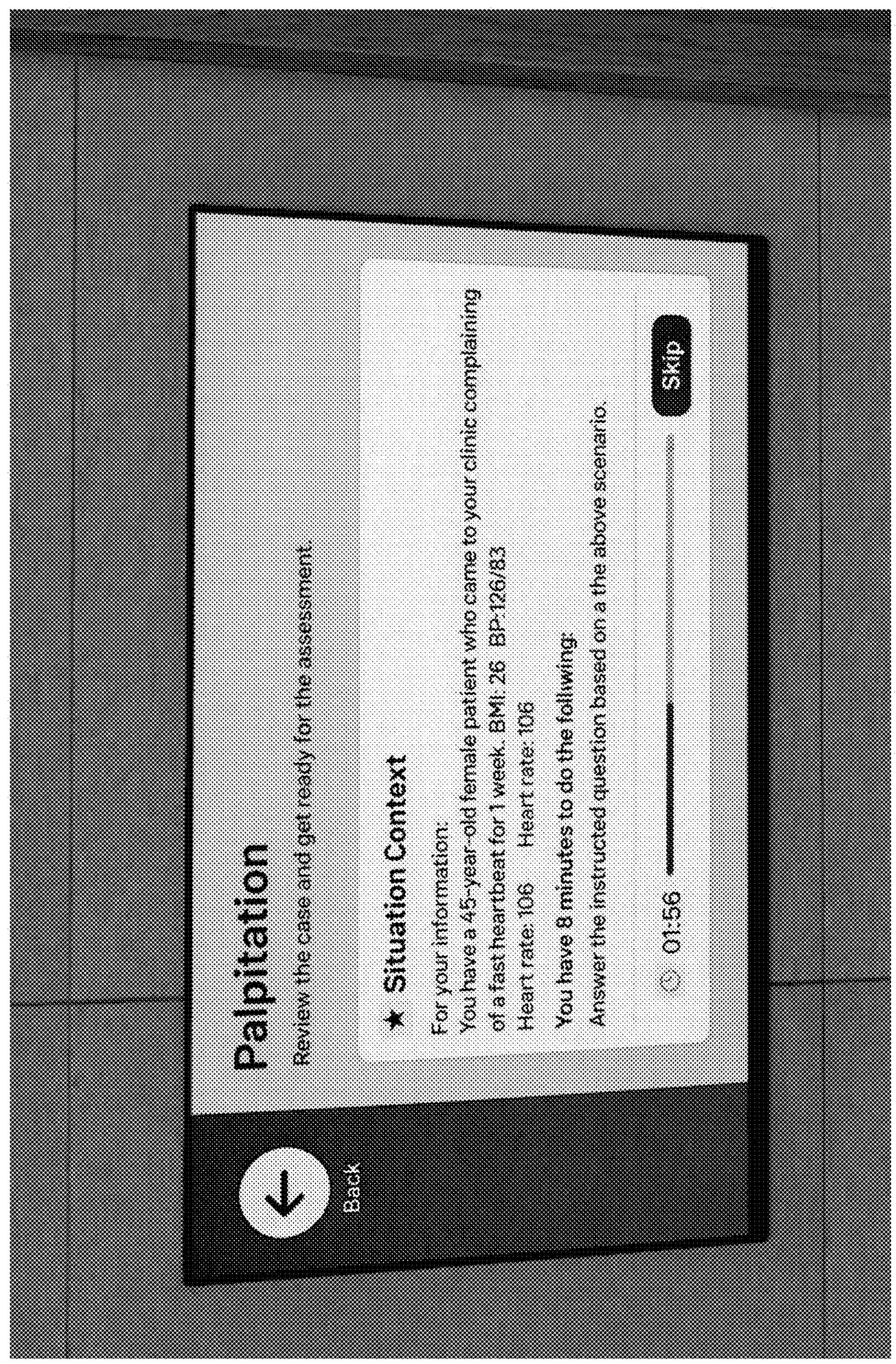
FIG. 29 illustrates an example SOE case description interface presenting a scenario context during a timed reading period prior to question delivery.

FIG. 27 illustrates a representative SOE practice interface by which a learner selects a specialty and selects a case. FIGS. 28-29 illustrate a representative case door interface and a case description interface in which scenario context is displayed during a pre-station reading period prior to question delivery.

Figure 30:
FIG. 30 illustrates an example SOE examination room in which a doctor examiner is present and in which no patient avatar is presented, the doctor examiner being configured to ask the learner clinical questions about the case.

FIG. 30 illustrates a representative SOE examination room in which a doctor examiner avatar is present and in which no patient avatar is presented. In certain embodiments, the doctor examiner avatar is driven by an AI model constrained by case data. In other embodiments, a remote human examiner provides prompts and/or audio that are delivered into the VR environment.

Figure 31:
FIG. 31 illustrates an example SOE question interaction interface including controls to repeat a question and to end a learner answer.

During an SOE station, the system presents each question to the learner and captures the learner's answer as speech evidence. FIG. 31 illustrates an example interface including controls to repeat a question and to end a learner answer. In certain embodiments, the system logs question prompt events and answer boundary events to associate transcript segments with a corresponding question identifier and time window.

Figure 32:
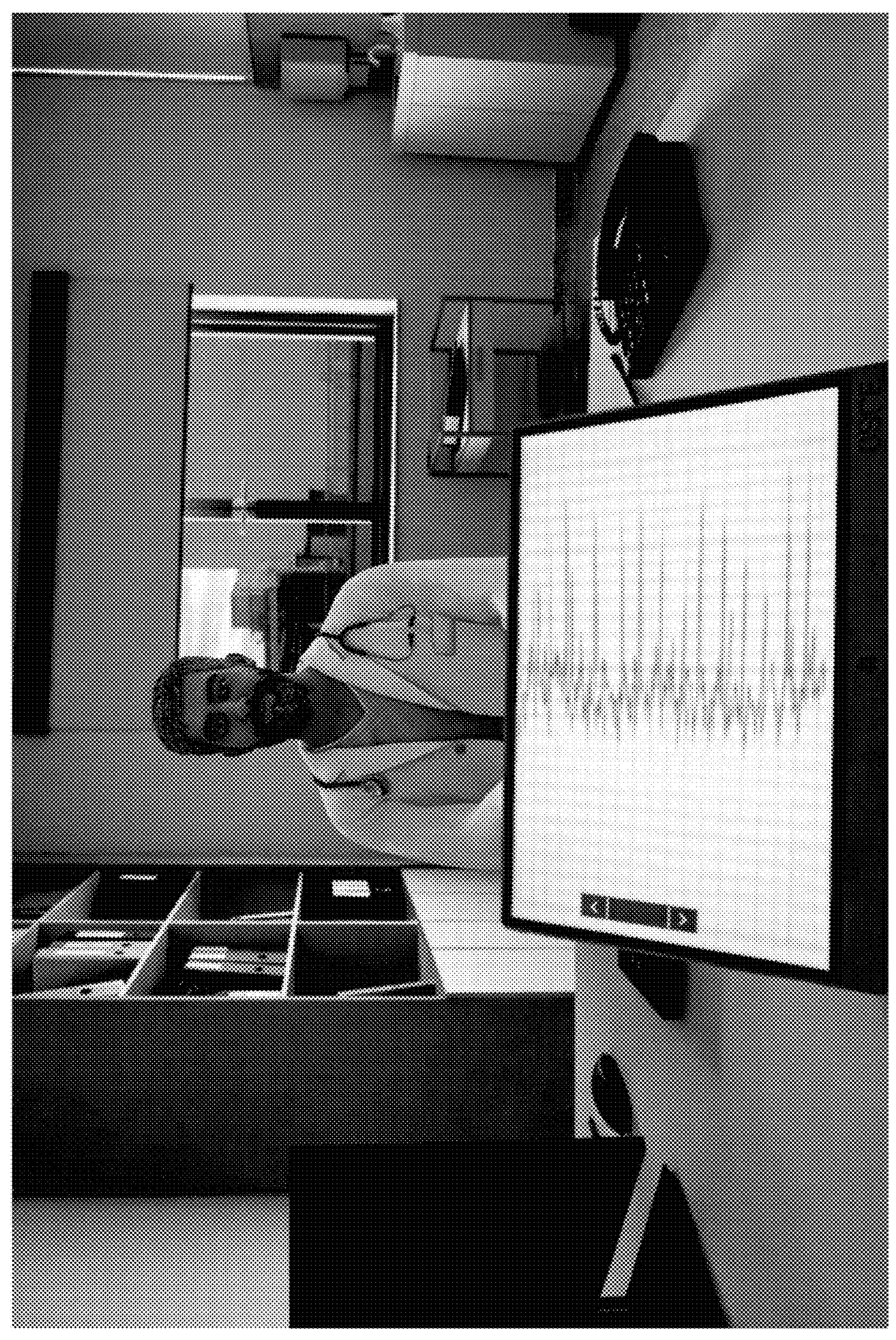
FIG. 32 illustrates an example investigation result display presented during an SOE station responsive to a learner-requested investigation, including one or more of an X-ray, ECG, or image.
Figure 33:
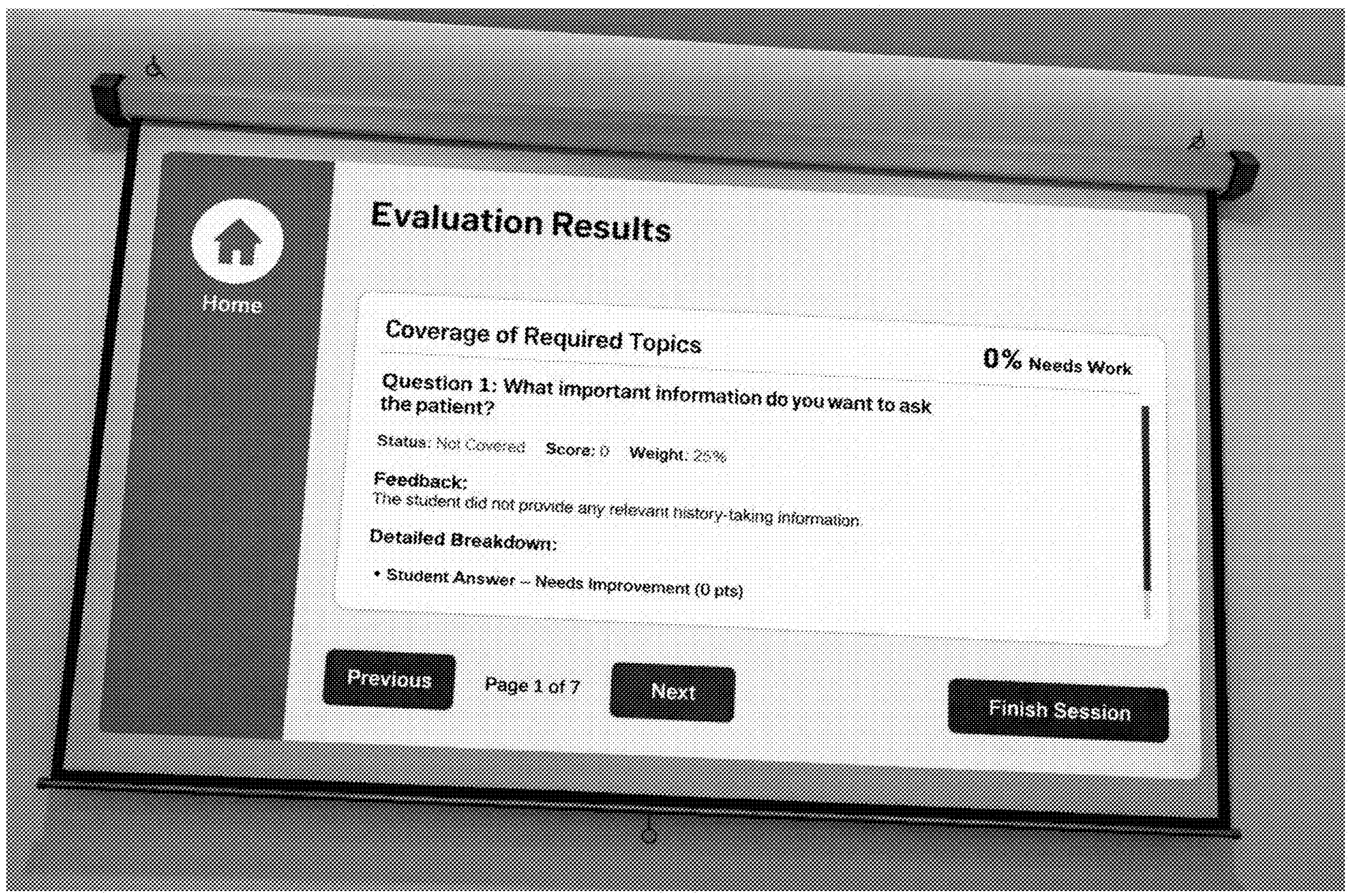
FIG. 33 illustrates an example SOE evaluation results interface presenting scoring and coverage results for a first question.
Figure 34:
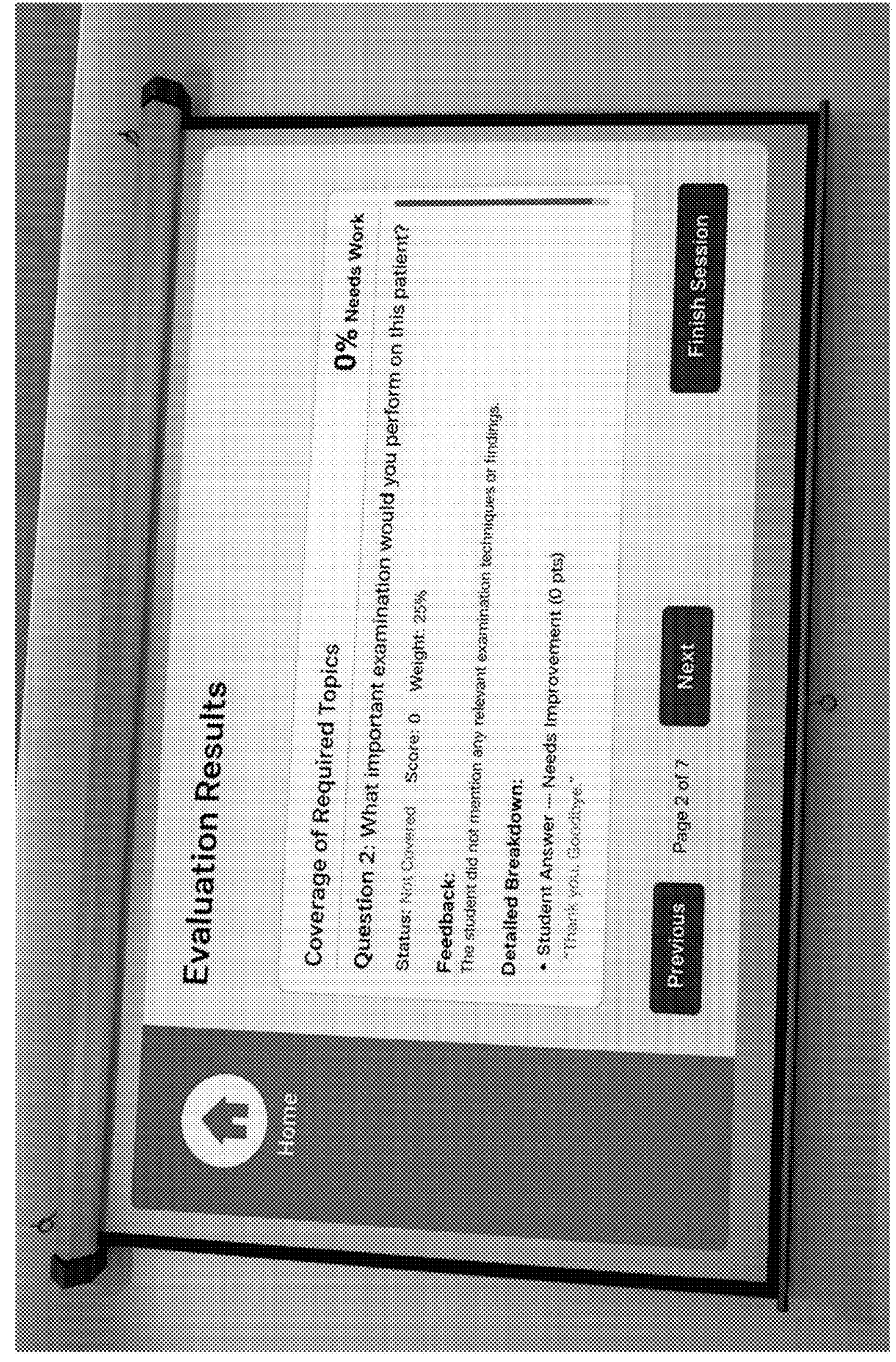
FIG. 34 illustrates an example SOE evaluation results interface presenting scoring and coverage results for a second question.
Figure 35:
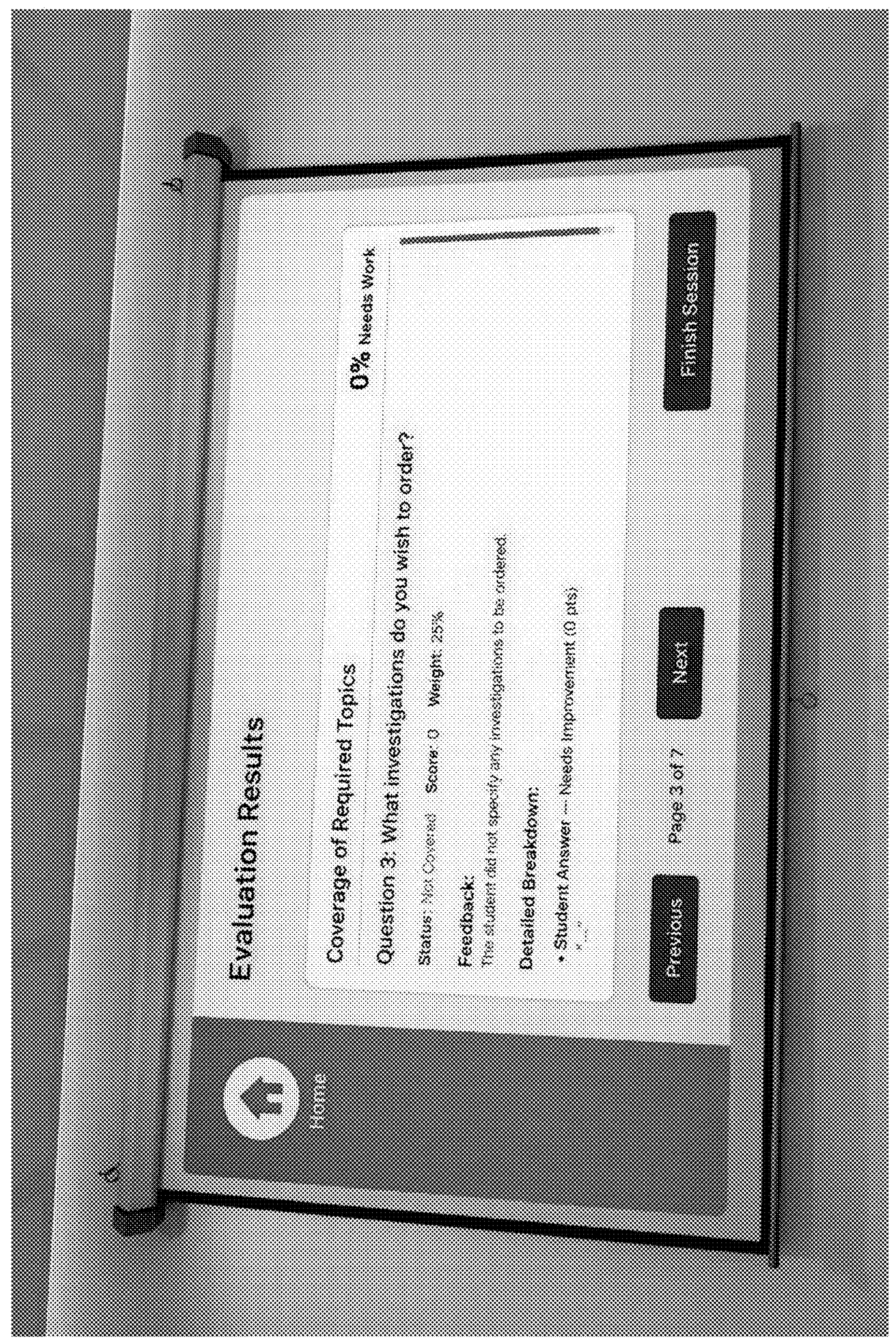
FIG. 35 illustrates an example SOE evaluation results interface presenting scoring and coverage results for a third question.
Figure 36:
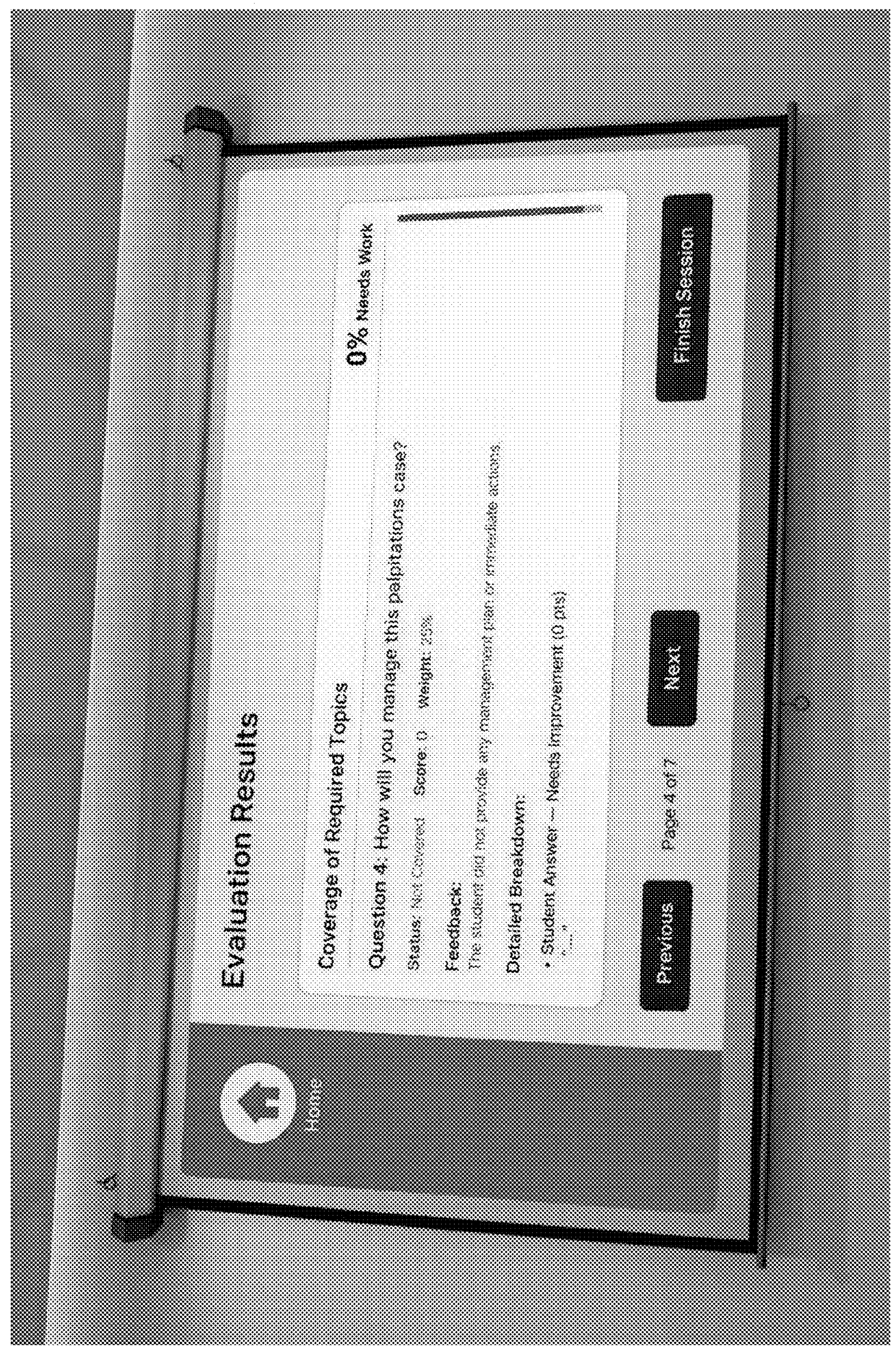
FIG. 36 illustrates an example SOE evaluation results interface presenting scoring and coverage results for a fourth question.

In certain embodiments, the SOE station allows the learner to request investigations, and the system responds by displaying an investigation result (e.g., an X-ray, ECG, or clinical image) and logging request and display events. FIG. 32 illustrates an example investigation result display.

Figure 37:
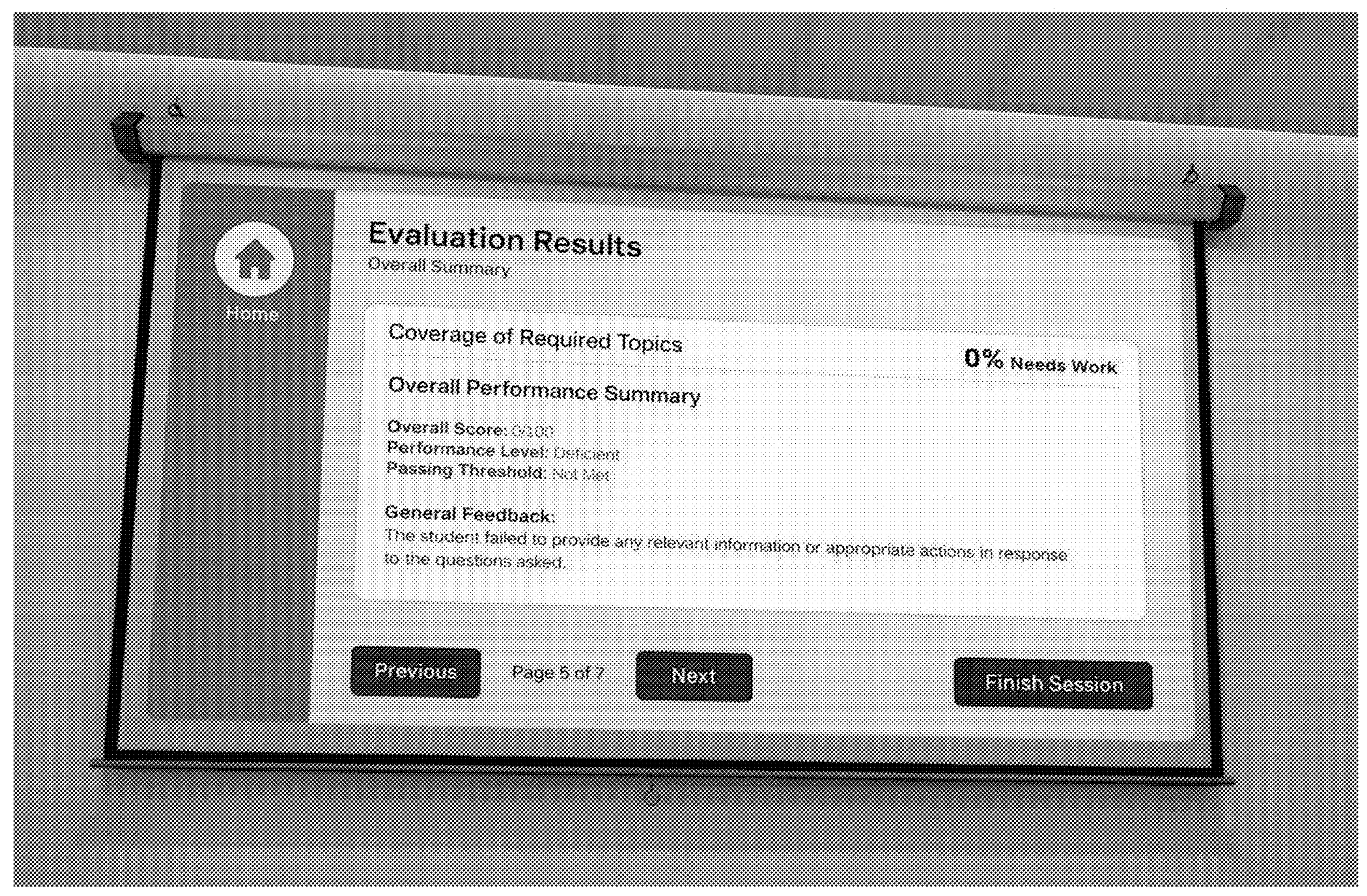
FIG. 37 illustrates an example SOE performance summary interface presenting coverage of required topics and overall performance for a specialty.
Figure 38:
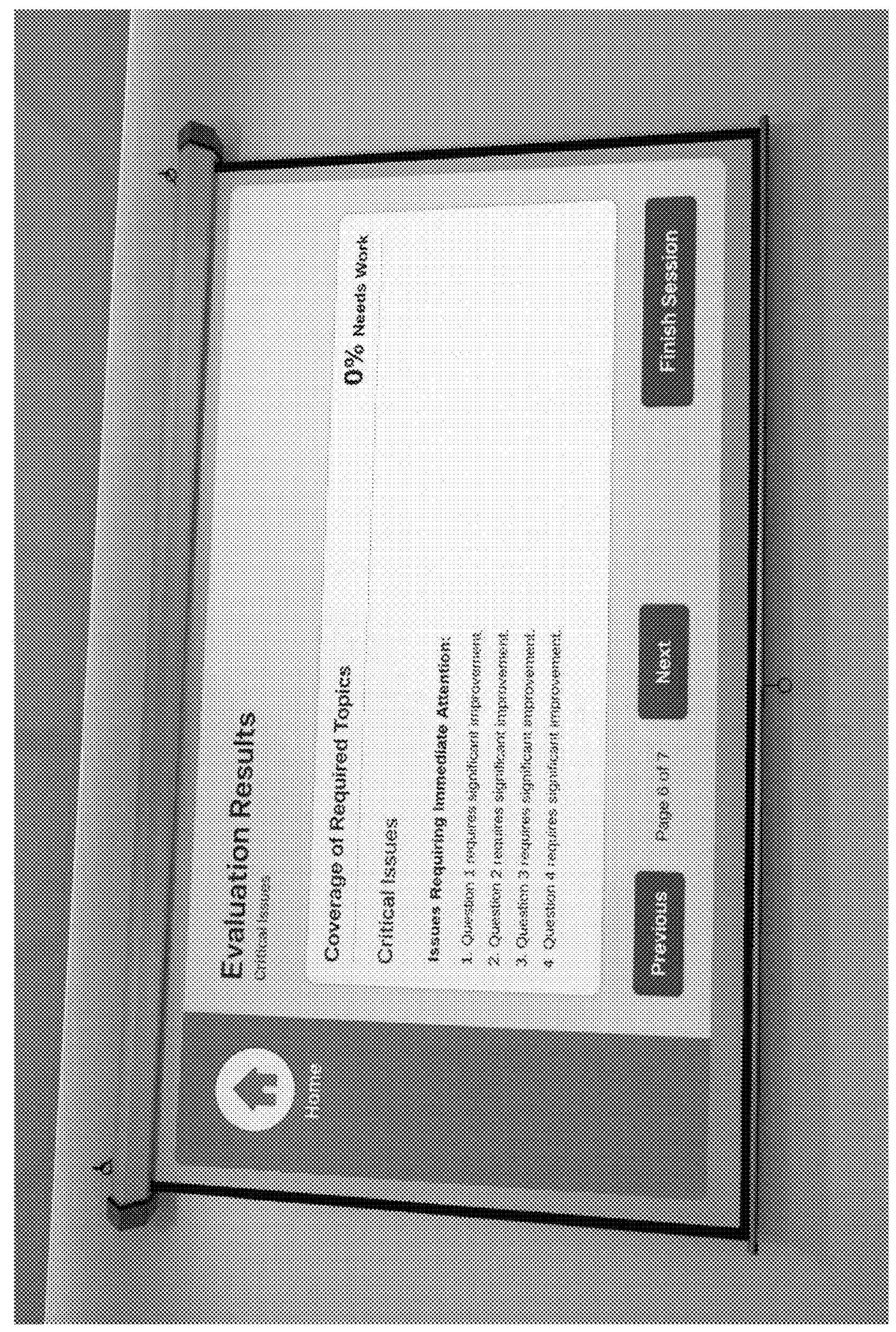
FIG. 38 illustrates an example SOE performance summary interface presenting coverage of required topics including critical issues.
Figure 39:
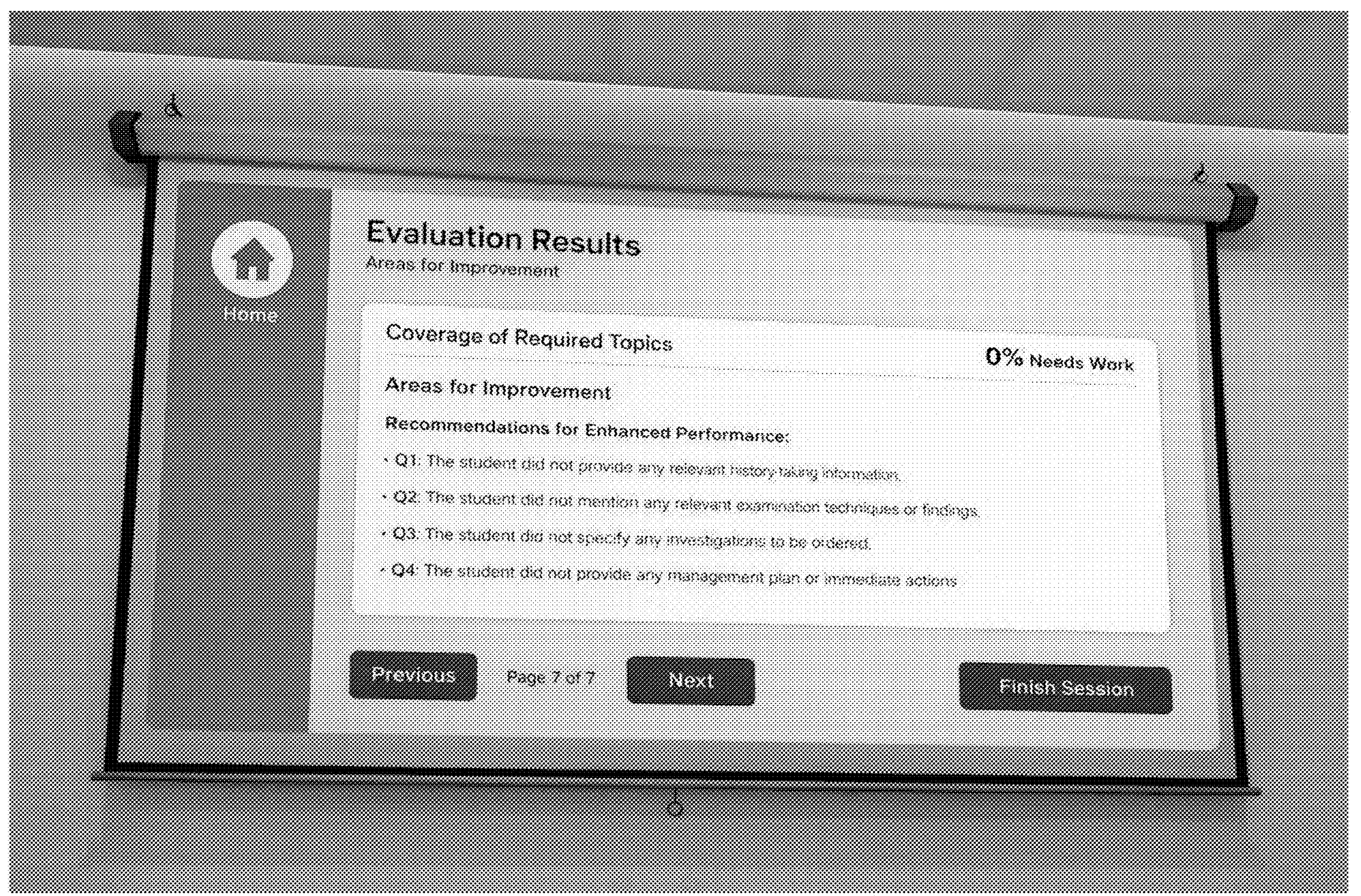
FIG. 39 illustrates an example SOE performance summary interface presenting coverage of required topics including areas for improvement.

In certain embodiments, the analytics engine scores each question based on coverage of required topics and quality of clinical reasoning and management. FIGS. 33-36 illustrate example per-question evaluation result interfaces. FIGS. 37-39 illustrate example SOE performance summaries including overall performance, critical issues, and areas for improvement.

Example Embodiments

The following example embodiments are representative and are not limiting.

Embodiment 1: Guided mode versus timed mode. A learner selects a case and selects guided mode or timed mode. In guided mode the VR client renders prompts and contextual tips and may present real-time required-topic coverage indicators. In timed mode the VR client and the session orchestrator enforce station timing under a server-authoritative clock, including a pre-station reading period and a station duration window.

Embodiment 2: Free-form speech plus interaction fusion scoring in an OSCE station. During an encounter, the learner asks free-form questions to a virtual patient while performing interactions including tool-use actions and interface selections. The system generates transcript segments from audio and semantic interaction events from telemetry, normalizes both into a unified event schema, aligns them temporally, generates evidence tokens, and updates a rubric ledger to compute scoring deltas, required-topic coverage metrics, and domain scores.

Embodiment 3: SOE per-question scoring with an AI-driven doctor examiner avatar. During an SOE station, an examiner subsystem presents a structured sequence of clinical questions about a case. The system logs question prompts, captures the learner's spoken answers, associates transcript segments with question identifiers, generates evidence tokens for diagnosis, reasoning, and management components, and updates a rubric ledger to compute per-question scores and required-topic coverage. The system generates an SOE report including per-question results, critical issues, and areas for improvement.

Embodiment 4: Remote examiner trigger causing dynamic state transition. While observing a live session via an observer stream, a remote examiner issues a trigger message (e.g., condition worsens; advance to next question; reveal investigation result). The session orchestrator validates the trigger, logs it with provenance, applies it to the branch graph state machine to transition scenario state, and the station presentation updates accordingly.

Embodiment 5: Local versus backend-managed speech and scoring. In some embodiments, portions of speech recognition and/or scoring execute on the learner device for latency reduction. In other embodiments, speech recognition, language understanding, and/or scoring execute on backend servers to support larger models and centralized governance. When third-party AI services are used, the backend management system brokers requests using server-side credentials and session-bound authorization, while session orchestration remains server-authoritative for timing and state control.

Embodiment 6: Optional export formats and audit logs. In some embodiments, the system exports reports in one or more formats and stores time-indexed audit logs including examiner prompts, question events, normalized events, and evidence tokens to support post-session review.

Embodiment 7: Entitlement-controlled session initiation and immutable case version binding. A user authenticates to a backend management system that verifies a subscription or institutional entitlement and issues a session-bound authorization mechanism. When the user initiates a station, the session orchestrator binds the session to a specific approved case version and rubric definition, delivers protected case content only for the active session, logs an audit record of delivered versions, and clears protected case content from the learner device at session end.

The invention claimed is:

1. A computerized system for virtualizing a structured clinical assessment station selected from an objective structured clinical examination (OSCE) station and a structured oral examination (SOE) station, the system comprising:

a learner computing device comprising a head-mounted display and one or more input sensors, the learner computing device configured to execute a virtual reality client that renders a virtual clinical station and captures multimodal interaction data including (i) speech evidence comprising at least one of audio frames of learner speech or transcript segments derived from the audio frames and (ii) interaction telemetry comprising at least one of tool-use interactions or interface selections within the virtual clinical station;

an examiner subsystem configured to provide examiner messages for the station session, the examiner messages comprising at least one of a trigger message, a question prompt message, or an annotation;

a session orchestrator server comprising one or more processors and memory storing instructions that, when executed, cause the session orchestrator server to:

(a) initialize a station session including a session identifier and a station time window governed by a server-authoritative clock;

(b) receive, from the virtual reality client, the speech evidence and raw interaction events derived from the interaction telemetry;

(c) generate an ordered event timeline by assigning authoritative timestamps and transforming the speech evidence and the raw interaction events into normalized event log entries each having at least: a session identifier, an authoritative timestamp, an actor identifier, an event type, and a typed payload; and (d) maintain a scenario state for the station session according to a branch graph data structure comprising nodes and conditional edges, and update the scenario state responsive to at least one of (i) a normalized event log entry and (ii) an examiner message from the examiner subsystem; and an analytics engine comprising one or more processors and memory storing instructions that, when executed, cause the analytics engine to:

(e) maintain a rubric ledger data structure comprising a plurality of rubric item records, each rubric item record including a rubric item identifier, a satisfaction status, and one or more linked evidence tokens;

(f) for each received normalized event log entry, generate at least one evidence token referencing the normalized event log entry, apply ledger update rules that update at least one rubric item record based on the evidence token, and compute a scoring delta; and (g) generate a station report artifact based on aggregated rubric ledger states and transmit at least one feedback indicator to the virtual reality client.

2. The system of claim 1, wherein the normalized event log entries further comprise a sequence number and a payload schema that differs by event type and includes, for a speech event type, a reference to a transcript segment having a start time, an end time, recognized text, and a confidence value.

3. The system of claim 1, wherein transforming the raw interaction events into the normalized event log entries comprises mapping pose telemetry and object-interaction events into a semantic tool-use event indicating a tool identifier, a body region identifier, and a dwell duration.

4. The system of claim 1, wherein the analytics engine temporally aligns at least one speech-derived evidence token with at least one interaction-derived evidence token and updates a rubric item record based on an ordering relationship between a transcript segment and an interaction event.

5. The system of claim 1, wherein the rubric ledger data structure stores, for each rubric item record, a weight value and a last-updated timestamp, and the analytics engine computes at least one domain score by aggregating weighted rubric item records for a competency domain.

6. The system of claim 1, wherein the station time window includes a pre-station reading period and at least one checkpoint time, and the session orchestrator server enforces timing by marking events received after an end time as late events and excluding the late events from scoring while retaining the late events in the event timeline for audit.

7. The system of claim 1, wherein the branch graph nodes specify at least one of: enabled tools for a station phase, permitted examiner message types, permitted investigation identifiers, or examiner prompt parameters.

8. The system of claim 1, wherein the virtual reality client provides a guided mode and a timed mode, and in the guided mode renders contextual tips or prompts while in the timed mode suppresses at least a portion of the contextual tips or prompts and enforces the station time window under the server-authoritative clock.

9. The system of claim 1, wherein the station report artifact comprises (i) a coverage of required topics interface that provides, for a plurality of topics, a status value, a score value, and narrative feedback and (ii) a summary interface that includes at least one of critical issues or areas for improvement.

10. The system of claim 1, further comprising a backend management subsystem configured to authenticate a user, validate a subscription or institutional entitlement, and issue a session-bound authorization mechanism used by the virtual reality client to request protected case content and to initiate the station session, wherein the virtual reality client clears protected case content from local storage when the station session terminates or when the session-bound authorization mechanism expires.

11. The system of claim 10, further comprising a scenario service that stores a plurality of cases as versioned records having publication states, wherein the session orchestrator server binds the station session to an immutable approved case version identifier and stores the immutable approved case version identifier in association with the ordered event timeline and the station report artifact.

12. The system of claim 1, wherein the examiner subsystem comprises a remote examiner interface configured to receive an observer stream synchronized to the server-authoritative clock and to transmit the examiner messages via a command channel, and wherein the session orchestrator server logs each examiner message as a normalized event log entry including provenance fields identifying an examiner source and an authoritative timestamp.

13. The system of claim 1, wherein the structured clinical assessment station is an SOE station in which the examiner subsystem presents a plurality of clinical questions about a case, and wherein: (a) the session orchestrator server sequences the plurality of clinical questions by transmitting question prompt messages each associated with a question identifier; and (b) the analytics engine computes per-question scoring results by associating transcript segments of learner answers to the question identifiers and applying ledger update rules for required-topic coverage, diagnosis, clinical reasoning, and management.

14. The system of claim 13, wherein the virtual reality client renders (i) a control to repeat a question and a control to end an answer and (ii) an investigation request control, and wherein selections of the repeat-question control, the end-answer control, and the investigation request control are logged as normalized event log entries, and responsive to an investigation request selection the virtual reality client renders an investigation result and the rendering of the investigation result is logged as a normalized event log entry.

15. A computer-implemented method for virtualizing a structured clinical assessment station selected from an objective structured clinical examination (OSCE) station and a structured oral examination (SOE) station, the method comprising:

(a) rendering, by a virtual reality client executing on a learner computing device having a head-mounted display, a virtual clinical station including at least one of a virtual patient avatar or an examiner avatar;

(b) capturing multimodal interaction data including speech evidence comprising at least one of audio frames of learner speech or transcript segments derived from the audio frames and interaction telemetry for tool-use interactions and interface selections within the virtual clinical station;

(c) generating transcript segments from the audio frames and generating raw interaction events from the interaction telemetry;

(d) transmitting the speech evidence and the raw interaction events to a session orchestrator server that maintains a server-authoritative clock and a station time window;

(e) at the session orchestrator server, transforming the speech evidence and the raw interaction events into normalized event log entries each having at least a session identifier, an authoritative timestamp, an actor identifier, an event type, and a typed payload, and ordering the normalized event log entries into an event timeline;

(f) maintaining a scenario state according to a branch graph and updating the scenario state responsive to at least one normalized event log entry and responsive to at least one examiner message;

(g) maintaining, by an analytics engine, a rubric ledger comprising rubric item records that store satisfaction status and linked evidence tokens;

(h) generating evidence tokens from the normalized event log entries and applying ledger update rules to update satisfaction status of at least one rubric item record and compute a scoring delta; and (i) generating a station report artifact based on aggregated rubric ledger states, wherein examiner messages are logged with provenance fields and applied to the branch graph to cause a dynamic scenario state transition.

16. The method of claim 15, wherein the structured clinical assessment station is an SOE station and further comprises:

(a) presenting, by an examiner subsystem, a structured sequence of clinical questions about a case;

(b) capturing learner spoken answers; and (c) computing per-question scores by associating transcript segments to question identifiers.

17. A non-transitory computer-readable medium storing instructions that, when executed by one or more processors, cause a computerized system to perform operations comprising:

(a) receiving speech evidence comprising at least one of transcript segments derived from audio frames of learner speech or the audio frames of learner speech, and receiving raw interaction events derived from interaction telemetry captured during a virtual reality station selected from an OSCE station and an SOE station;

(b) assigning authoritative timestamps to the speech evidence and the raw interaction events based on a server-authoritative clock;

(c) transforming the speech evidence and the raw interaction events into normalized event log entries each having at least a session identifier, an authoritative timestamp, an actor identifier, an event type, and a typed payload, and ordering the normalized event log entries into an event timeline;

(d) maintaining a scenario state according to a branch graph and applying an examiner message to cause a scenario state transition;

(e) maintaining a rubric ledger comprising rubric item records linked to evidence tokens;

(f) generating evidence tokens from the normalized event log entries, updating at least one rubric item record using ledger update rules, and computing a scoring delta; and (g) generating a station report artifact based on aggregated rubric ledger states and transmitting at least one feedback indicator based on the scoring delta.

18. The computer-readable medium of claim 17, wherein the normalized event log entries include, for a question prompt event type, a question identifier and a time window used to associate learner answer transcript segments to a corresponding question.

19. The computer-readable medium of claim 17, wherein the operations further comprise providing a guided mode and a timed mode including enforcing a pre-station reading period and a station duration window under the server-authoritative clock.

20. The computer-readable medium of claim 17, wherein the operations further comprise receiving an investigation request selection and rendering an investigation result during an SOE station and linking the investigation request selection and the investigation result to at least one evidence token.

* * * * *